United States Patent
Matsuzawa et al.

[11] Patent Number: 6,085,185
[45] Date of Patent: Jul. 4, 2000

[54] RETRIEVAL METHOD AND SYSTEM OF MULTIMEDIA DATABASE

[75] Inventors: Shigeru Matsuzawa, Machida; Yoshihiro Takiyasu, Kodaira, both of Japan

[73] Assignee: Hitachi, Ltd., Tokyo, Japan

[21] Appl. No.: 08/888,236

[22] Filed: Jul. 3, 1997

[30] Foreign Application Priority Data

Jul. 5, 1996 [JP] Japan ................................ 8-176083

[51] Int. Cl.⁷ ........................................... G06F 17/30
[52] U.S. Cl. ............................ 707/2; 707/1; 707/102; 707/200; 707/205
[58] Field of Search ............................ 707/1, 2, 102, 707/200, 205

[56] References Cited

U.S. PATENT DOCUMENTS

| | | | |
|---|---|---|---|
| 5,369,778 | 11/1994 | San Soucie et al. | 707/103 |
| 5,428,731 | 6/1995 | Powers, III | 707/501 |
| 5,634,057 | 5/1997 | Dickinson | 709/303 |
| 5,634,129 | 5/1997 | Dickinson | 395/683 |
| 5,655,117 | 8/1997 | Goldberg et al. | 395/613 |
| 5,873,097 | 2/1999 | Harris et al. | 707/203 |
| 5,884,035 | 3/1999 | Butman et al. | 709/218 |

OTHER PUBLICATIONS

Open Media Framework, OMF Interchange Specification Version 2.0, Jan. 17, 1996, Avid Technology, pp. 1–14.

*Primary Examiner*—Thomas G. Black
*Assistant Examiner*—Jean Bolte Fleurantin
*Attorney, Agent, or Firm*—Beall Law Offices

[57] ABSTRACT

A multimedia database system effectively retrieves the contents in an optional storage position of an optional medium among a large amount of video and audio media. When a user puts an annotation to a specific range of a medium, the system registers an annotation object comprising the object ID of the target medium, specific range, and annotation information in a table. Next, when an annotation is put to a specific range of a medium once, the system automatically produces annotation objects for all media in the citation relation to it. The system manages the link relation between the citation destination and the citation source by a management table which is newly installed. The system retrieves the table and displays an annotation list coincident with the retrieval condition.

18 Claims, 21 Drawing Sheets

FIG. 2

MEDIA OBJECT MANAGEMENT TABLE 50

| OBJECT ID | TITLE ID | MEDIA KIND CODE | LOCATION INFORMATION | ATTRIBUTE INFORMATION OF MEDIA OBJECT |
|---|---|---|---|---|
| M01 | T01 | Video, . . . | / tmp / V / file1 | . . . |
| M02 | T01 | Audio, . . . | / tmp / A / file2 | . . . |
| M03 | T02 | Video, . . . | / tmp / V / file3 | . . . |
| . . . | . . . | . . . | . . . | . . . |

FIG. 3

COPIED SECTION OBJECT MANAGEMENT TABLE 60

| 601 OBJECT ID | 602 DESTINA-TION MEDIA OBJECT ID | 603 IN-POINT TIME CODE VALUE ON DESTINATION MEDIA | 604 OUT-POINT TIME CODE VALUE ON DESTINATION MEDIA | 605 SOURCE MEDIA OBJECT ID | 606 IN-POINT TIME CODE VALUE ON SOURCE MEDIA | 607 OUT-POINT TIME CODE VALUE ON SOURCE MEDIA |
|---|---|---|---|---|---|---|
| L01 | M03 | 01:23:30:05 | 01:23:31:00 | M01 | 01:13:28:05 | 00:13:29:00 |
| L02 | M03 | 01:17:45:10 | 01:17:46:30 | M01 | 01:54:29:10 | 01:54:30:30 |
| ... | ... | ... | ... | ... | ... | ... |

ANNOTATION OBJECT MANAGEMENT TABLE (TEXT TYPE) 70

| OBJECT ID 701 | TARGET MEDIA OBJECT ID 702 | IN-POINT TIME CODE VALUE 703 | OUT-POINT TIME CODE VALUE 704 | ANNOTATION KIND 705 | ANNOTATION INFORMATION 706 |
|---|---|---|---|---|---|
| A01 | M01 | 01:37:35:08 | 01:37:35:18 | "KEYWORD" | "CONDUCTOR LIMER" |
| A01 | M02 | 01:10:15:00 | 01:45:32:00 | "KEYWORD" | "BEETHOVEN SYMPHONY #3" |
| ... | ... | ... | ... | ... | ... |

ANNOTATION OBJECT MANAGEMENT TABLE (THUMBNAIL IMAGE STYLE) 70

| OBJECT ID 701 | TARGET MEDIA OBJECT ID 702 | IN-POINT TIME CODE VALUE 703 | OUT-POINT TIME CODE VALUE 704 | ANNOTATION KIND 705 | ANNOTATION INFORMATION 706 |
|---|---|---|---|---|---|
| A03 | M01 | 01:37:25:00 | 01:37:35:00 | "THUMBNAIL IMAGE" | /tmp/img/f234.bmp |
| ... | ... | ... | ... | ... | ... |

ANNOTATION OBJECT MANAGEMENT TABLE (USER DEFINITION TYPE) 70

| OBJECT ID 701 | TARGET MEDIA OBJECT ID 702 | IN-POINT TIME CODE VALUE 703 | OUT-POINT TIME CODE VALUE 704 | ANNOTATION KIND 705 | ANNOTATION INFORMATION 706 |
|---|---|---|---|---|---|
| A03 | M01 | 01:37:25:00 | 01:37:35:30 | USER DEFINITION IDENTIFICATION CODE | USER DEFINED DATA STRUCTURE |
| ... | ... | ... | ... | ... | ... |

FIG. 7

ANNOTATION DEFINITION KIND
MANAGEMENT TABLE 80

| ANNOTATION KIND | TABLE NAME |
|---|---|
| KEYWORD | AA |
| THUMBNAIL | BB |
| ⋮ | ⋮ |

FIG. 8

CITATION LINK TABLE 650

| MEDIA OBJECT ID | IN-POINT TIME CODE VALUE | OUT-POINT TIME CODE VALUE |
|---|---|---|
| M01 | 01:37:25:00 | 01:37:35:30 |
| M01 | 01:37:25:00 | 01:37:35:30 |
| ⋮ | ⋮ | ⋮ |

# 6,085,185

RETRIEVAL METHOD AND SYSTEM OF MULTIMEDIA DATABASE

BACKGROUND OF THE INVENTION

The present invention relates to a database system for preserving and reusing multimedia data such as video, audio, and animation and more particularly to cm efficient retrieval method and retrieval system using the multimedia database.

The following are typical examples of the prior art relating to retrieval of a multimedia database.

(1) Video on demand (VOD) service as a service for a CATV contract household

For example, descriptive attribute information of the entire title such as title name, distribution company, and actors and actresses are given to one video movie and this attribute information is stored, for example, in a relational database in a tabular form. According to the request (query) from a viewer, information among this attribute information which coincides with the conditions are displayed on the viewer screen in a tabular form or a visual form and the viewer selects the desired title from them. A respect that the retrieval unit has a large granularity at the unit of title is a characteristic of this kind of art.

(2) For example, an OMF (open media framework) interchange specification (Version 2.0) which is one of the replacement forms of contents during creation in the multimedia contents creation field is proposed.

During creation of one multimedia content comprising composed video data and audio data, a model in which a plurality of tracks are defined for video and audio is used. Each track also comprises a plurality of video sources so that a video A appears until a certain time and a video B follows it thereafter. Namely, elements such as video and audio constituting a multimedia title can be operated independently.

Particularly, in the OMF interchange specification, history information can be expressed, for example, as a source from which an element (for example, a part of video data) to be incorporated into a certain title is created at the preceding stage, or such as for example, a video tape having recorded video is captured and fetched at a particular compression rated.

However, in the OMFIS, an effective retrieval function for video and audio and a realization method thereof are not disclosed.

SUMMARY OF THE INVENTION

When a desired portion is to be retrieved from video data and audio data stored in a large number of tape media, by looking at the label attached to a medium such as a cassette on which it is recorded depending on an ambiguous memory and loading and previewing a medium which seems to be the target one into a regenerator unit, it is ascertained whether it is the one under retrieval or not. Or, a full-time staff for executing such work is appointed as an organization and the desire of a retriever is notified to a full-time staff. However, he also finds a medium according to the same procedure depending on his memory. If there is no method other than such a retrieval method, as the number of materials such as video and audio increases, the retrieval becomes difficult and as a result, the valuable material property is kept idle increasingly.

The retrieval intention of a user is often to retrieve a specific portion among the materials of video and audio stored on one medium. Even if the medium is found, to obtain the recording position of the desired material in it, preview work by a regenerator unit is also necessary.

Furthermore, the material is combined with another material by the editing work and outputted to a new medium. Therefore, video and audio retrieved by a user may be recorded in different positions of a plurality of media. If, when a user, for example, retrieves a video of Mt. Everest, as a result of retrieval of the video, he has a retrieval intention that his desired video must be found after the tape portion on which Mt. Everest is recorded, it is necessary to cite all Mt. Everest used in a plurality of media as candidates of the retrieval object.

Recently, a trend of storing video and audio in a file of a computer system is developing due to a demand for tapeless storage. As a result, regeneration from an optional time position can be executed quickly because the feed operation for heading like a tape is not necessary. However, as mentioned above, when a user has no knowledge on position information of the portion to be found, the preview operation cannot be avoided.

An object of the present invention is to provide a method and system for effectively retrieving an optional recording position of an optional material (media object) without requiring such manual retrieval of a large amount of video and audio materials.

A user often desires to give comment information (hereinafter referred to as an annotation) in which a keyword for retrieval is expressed by a character and numeric string for a specific range of video and audio data. Taking notice of it, when a user defines an annotation in a specific range of the media object, the present invention decides the object ID of the target medium in which the annotation is defined, the specific range, and the annotation information as one object (hereinafter referred to as an annotation object) and manages a group of these annotation objects.

When the user designates an annotation retrieval condition, the group of annotation objects is retrieved, and annotation objects having annotation information coincident with or similar to the retrieval condition are all extracted, and an annotation list thereof is presented to the user in a tabular form. When the user designates the desired annotation object in the presented annotation list, the target media object is read from the multimedia database and the contents in the specific range are presented to the user. When the presented contents are not those which are being retrieved by the user, he stops the regeneration thereof and when he designates the next element in the annotation list, the contents in the predetermined range are also presented. By doing this, from a large amount of materials of video and audio, the contents in the recording position desired by the user can be retrieved effectively.

As an annotation, in addition to the text style such as a character and numeric string, when the target medium is video, a still image (this is referred to as a thumbnail image) of a frame in a specific position (for example, the top) in a specific range may be used. In this case, when a thumbnail image is defined in addition to the text (keyword) in the specific range, the annotation list is displayed, for example, in a tabular form on the screen on which the text as well as the thumbnail image are reduced. By doing this, for an annotation object selected by the user from the list, an actual video in the range can be played.

It requires much labor to put annotations anew to all materials and also to another media created by copying the materials. Therefore, according to the present invention, when an annotation is put to a specific range of a certain media object once, the annotation is automatically applied to specific ranges of all media objects in the citation relation to it.

Concretely, a group of copied section objects defining a link relation between media objects of a citation destination and media objects of a citation source are managed. When a user executing the editing work performs an operation for citing a part of a media object as a component of another media object, the copied section object is generated and registered. At the same time, the group of annotation objects is searched. When the annotation for the portion of the media object of the citation source is defined already, the annotation is diverted and an annotation object for the media object of the citation destination is automatically generated. When an annotation is defined for a specific range of a media object, media objects to which the range is cited are checked comprehensively from the aforementioned group of copied section objects and an annotation object for each cited media object is automatically generated. By doing this, saving of the labor for the registration operation of annotation objects is realized.

BRIEF DESCRIPTION OF THE DRAWINGS

FIG. 2 is a drawing showing a constitution example of a media object management table.

FIG. 3 is a drawing showing a constitution example of a copied section object management table.

FIG. 4 is a drawing showing a constitution example of a text annotation object management table.

FIG. 5 is a drawing showing a constitution example of a thumbnail image annotation object management table.

FIG. 6 is a drawing showing a constitution example of a user defined annotation object management table.

FIG. 7 is a drawing showing a constitution example of an annotation definition kind management table.

FIG. 8 is a drawing showing a constitution example of a citation link table.

DESCRIPTION OF THE PREFERRED EMBODIMENTS

The embodiments of the present invention will be explained in detail hereunder by referring to the accompanying drawings.

Figure 1:
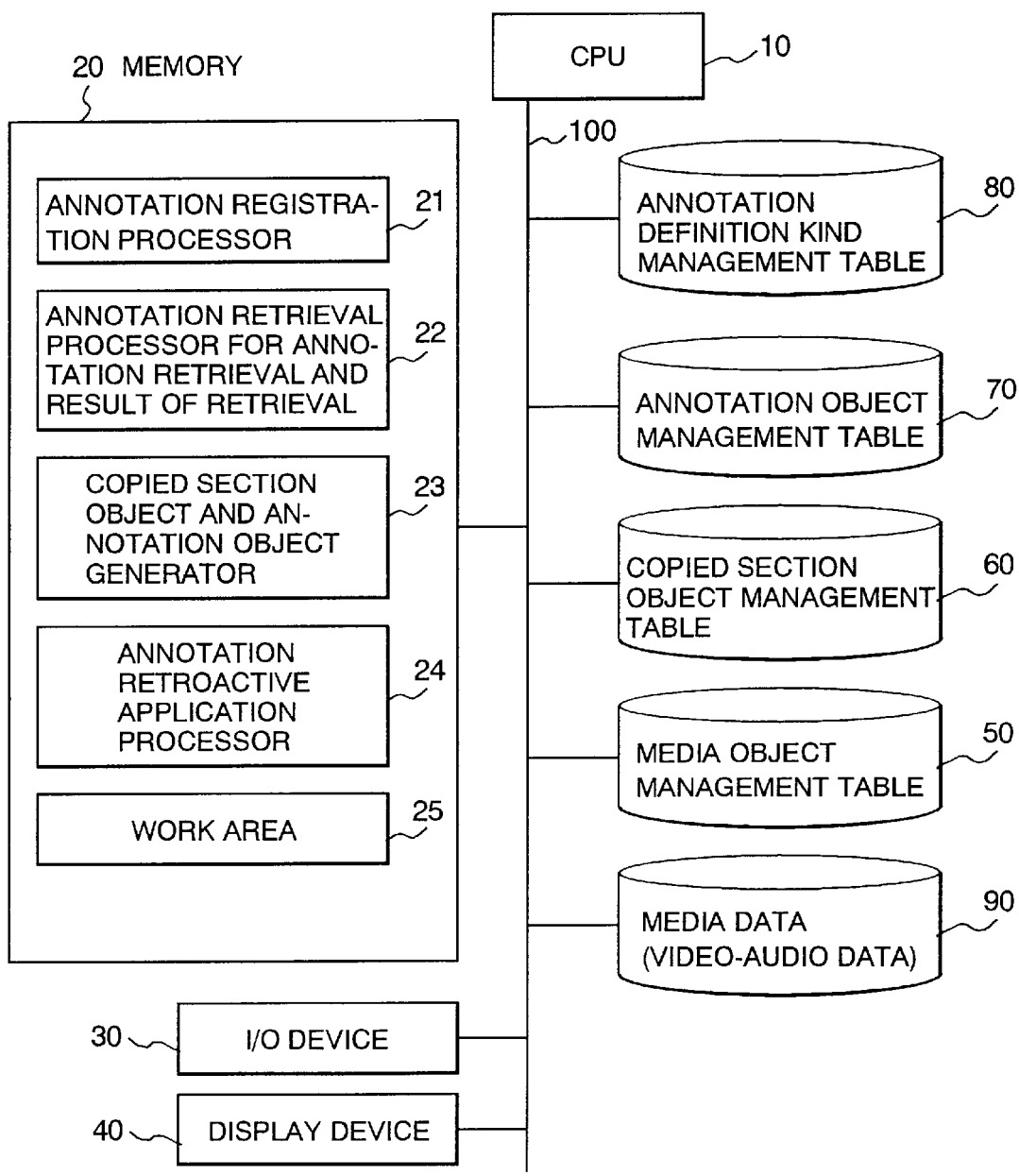
FIG. 1 is a system diagram showing the whole constitution of an embodiment of the present invention.

FIG. 1 shows a system block diagram of an embodiment of the present invention. The system comprises a central processing unit (CPU) 10 for controlling the whole system and executing various processes, a memory 20 for storing programs executed by the CPU 10 and data under processing, an I/O device 30 such as a keyboard for inputting a command and data, a display device 40 for displaying results of retrieval and others, a media object management table 50, a copied section object management table 60, an annotation object management table 70, an annotation definition kind management table 80, and a multimedia database 90 for storing video and audio data and the units are connected to each other via a data/control bus 100. The management tables 50 to 80 comprise, for example, files and memories. However, the files and memories may be all stored on a hard disk.

Numerals 21 to 24 in the memory 20 indicate processing programs particularly relating to the present invention and the processing programs execute the annotation registration process, the annotation retrieval process for annotation retrieval and result of retrieval, the generation process for copied section object and annotation object, and the annotation retroactive application process. These processes will be described in detail later. Numeral 25 in the memory 20 indicates a work memory, which is used to set various lists and tables temporarily which will be described later.

The term of multimedia database 90 is a term for general concept of files and tapes for storing many multimedia items comprising a video object, audio object, animation object, graphic object, and text object. For example, when the video object (video data) is taken into account, the video data is a row of still images of 15 or 30 frames per second which are slightly different from each other. When the still images are played on the display device 40 one after another, they are seen as a motion picture of continuous motion for the eyes of a human as an afterimage. There is a time code expression decided by SMPTE for designating the position of each frame available, which indicates hour:minute:second: frame in the form of HH:MM:SS:FF. With respect to playing from the predetermined time code position, when a correspondence table between the value of time code and the byte position on a file is provided, the byte position is found, and the file is read from the byte position, and when it is passed to the video board, it is displayed on the screen. When the video data is not preserved as a file of a magnetic disk but preserved on a beta cam tape as it is, playing from the designated time code position can be instructed under the machine control for the tape deck. This played video signal (NTSC, etc.) can be displayed on the display terminal via the video board connected to the system. Furthermore, when the NTSC monitor is directly connected, the output of the tape deck can be also displayed on the monitor screen. Almost in the same way, the audio object (audio data) is sampled by time and synchronized with the video data in time and voice is outputted.

According to the present invention, the storage form (file or tape) of video data and audio data is not significant. Namely, as management information, information (file name or tape ID) for discriminating a medium storing video data and a time code common to every medium are used. Actually, with respect to the means for playing video data, the realization method is different between a file and a tape as mentioned above. According to the present invention, the methods are abstracted as a device capable of feeding to the position designated by the time code and performing the playing operation from the position.

FIGS. 2 to 8 show constitution examples of the media object management table 50, the copied section object management table 60, the annotation object management table 70, the annotation definition kind management table 80, and the citation link table temporarily generated which will be described later.

FIG. 2 shows a constitution example of the media object management table 50. The media object management table 50 is a table for managing necessary information for each media object for many media data stored in the multimedia database 90. In FIG. 2, one record 510 corresponds to one media object and comprises an object ID 501 of the said media data, a title ID 502, a media kind code 503, location information 504, and other attribute information of media object 505.

When a media object (media data) is newly stored in the media database 90, a user inputs the record 510 from the I/O device 30 and registers it in the media object management table 50. When a media object is deleted from the media database 90, the user inputs the object ID from the I/O device 30 and designates deletion, and then the record of the media object management table 50 is deleted. With respect to deletion, it is possible to display the contents of the media object management table 50 on the display device 40 in a tabular form and designate the record on the display screen.

FIG. 3 shows a constitution example of the copied section object management table 60. The copied section object management table 60 is a table for managing the link relation of discrimination information of a citation destination/citation source medium and the citation position (in-point and out-point) in the medium when a user executing the editing work performs an operation for using (citing) a part of a media object as a component of another media object. In this case, the citation destination media object is called a destination object and the citation source media object is called a source object. The time code value is used for the citation position in the media and the in-point and out-point in the destination object are called an in-point time code value on destination media and an out-point time code value on destination media, and the in-point and out-point in the source object are called an in-point time code value on source media and an out-point time code value on source media.

In FIG. 3, one record 610 corresponds to one copied section object and comprises an object ID 601 for indicating the copied section object uniquely, a destination media object ID 602, an in-point time code value on destination media 603, an out-point time code value on destination media 604, a source media object ID 605, an in-point time code value on source media 606, and an out-point time code value on source media 607. For example, a copied section object having an object ID of L01 indicates that the frames between the time code values of a medium (source object) M01 "00:13:28:05" and "00:13:29:00" are used as frames between the time code values of another medium (destination object) M03 "01:23:30:05" and "01:23:31:00". This copied section object is generated whenever a user executing the editing work cites a part of a media object as a part of another media object and registered in the copied section object management table 60. When a media object is taken into account in this case, it may become a destination object and also a source object at the same time.

FIGS. 4 to 6 show constitution examples of the annotation object management table 70. When a user viewing and operating a medium (video, etc.) puts an annotation (comment information) to a specific range for convenience of later retrieval, the annotation object management table 70 is a table for managing discrimination information of a medium to which the annotation is put, a specific range (in-point time code value and out-point time code value), and annotation information (character and numeric string, thumbnail image, etc.) together as an annotation object. Specific ranges to which an annotation is put may be partially overlapped with each other. At the registration stage, they are registered in the annotation object management table 70 as different annotation objects.

In FIGS. 4 to 6, one record 710 corresponds to one annotation object and comprises an object ID 701 for indicating the annotation object uniquely, a target media object ID 702, an in-point time code value 703 and an out-point time code value 704 of a specific range to which an annotation is put, an annotation kind 705, and annotation information 706. In this case, FIG. 4 shows a type (text type) that a keyword such as text is used as an annotation, and FIG. 5 shows a type (thumbnail style) that still image data in which one frame in a specific position in a specific video range is reduced or a specific still image (thumbnail image) provided separately is used as an annotation, and FIG. 6 shows a type (user definition type) that a user particularly defines an annotation. These may be used properly depending on the use. As described later, when an annotation is defined in a specific range of an optional media object by referring to the copied section object management table 60, the annotation object 710 is automatically generated for all destination/source objects in the citation relation to the range.

FIG. 7 shows a constitution example of the annotation definition kind management table 80. The aforementioned annotation object management table 70 is provided at least for each annotation kind, and furthermore the same kind may be divided into a plurality of tables, and an intrinsic name (table name) is given to each management table. The annotation definition kind management table 80 is a table for managing the definition kind (type) of each annotation object management table and one record 810 corresponds to one annotation object management table and comprises an annotation kind 801 of the management table and a table name 802. FIG. 7 shows that, for example, an annotation object management table having a table name of "AA" is a keyword type.

FIG. 8 shows a citation link table 650 which is temporarily generated in the work area 25 of the memory 20 when the annotation retroactive application process which will be described later is performed. When an annotation is defined in a specific range of an optional media object (referred to as a noticed medium), the citation link table 650 is a table that all destination/source objects in the citation relation to the range are listed up from the copied section object management table 60 and one record 660 corresponds to one listed-up object and comprises a media object ID 651 and an in-point time code value 652 and an out-point time code value 653 in a range overlapping with a specific range of the noticed medium.

Next, the annotation registration process 21, the annotation retrieval process for annotation retrieval and result of retrieval 22, the generation process for copied section object and annotation object 23, and the annotation retroactive application process 24 shown in FIG. 1 will be explained sequentially.

<ANNOTATION REGISTRATION PROCESS>

Figure 9:
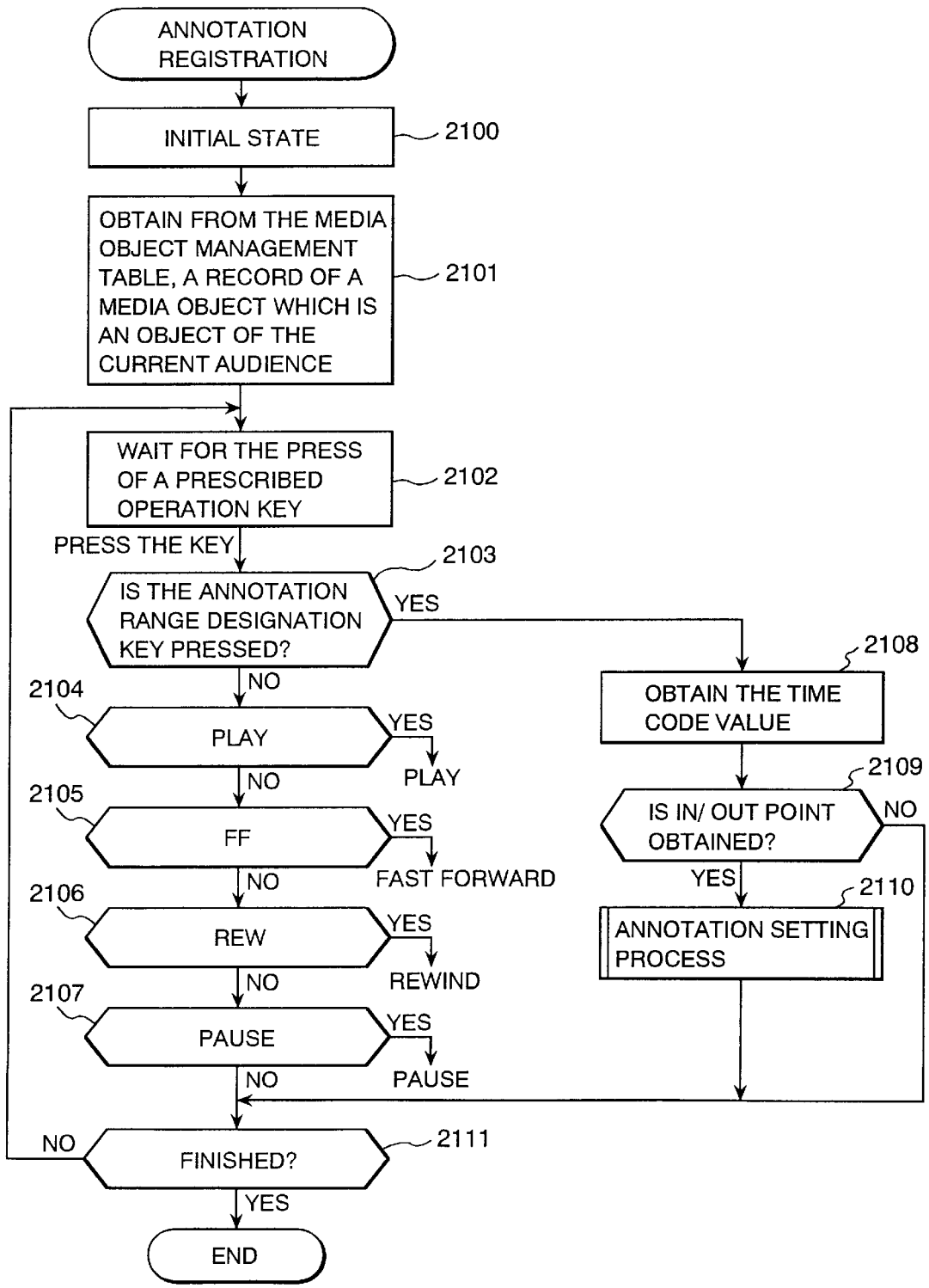
FIG. 9 is a whole flow chart of an embodiment of the annotation registration process.

This is a process of registration of an annotation object 710 newly in the annotation object management table 70 when a user defines an annotation in a specific range (specific time code range) by viewing video and audio data. FIG. 9 shows a whole flow chart of the annotation registration process 21.

When a medium is played, a user generally displays the contents of the media object management table 50 on the display device 40 in a tabular form and instructs a desired object ID. By doing this, the said media object is read from the multimedia database 90 and displayed on the display device 40, for example, in the case of video data. The initial state at Step 2100 shown in FIG. 9 indicates it.

The CPU 10 obtains the record 510 of a media object which is an object of the current audience from the media object management table 50 (Step 2102) and waits for the press of the key by the user (Step 2103). The user visually checks the video on the display device 40 and performs operations such as play, fast forward, rewind, and pause by the I/O device 30 (Steps 2104 to 2107). When he desires to put (define) an annotation to a specific video and audio range, he presses the annotation range designation key at the in and out points of the range. The CPU 10 decides the press of the annotation range designation key whenever the key is pressed (Step 2103) and when the annotation range designation key is pressed, the CPU 10 obtains the time code value at the position (Step 2108). When the annotation range designation key is pressed two times and the CPU 10 obtains the time code values at the in and out points of the range (Step 2109), the CPU 10 executes the annotation setting process (Step 2110). By this annotation setting process, one annotation object 710 is registered in the annotation object management table 70.

The annotation registration process ends when the user presses the end key (Step 2111). However, when the annotation range designation key is pressed again before it, the next annotation registration is executed continuously. Hereafter, this operation is repeated as many times as required until the end key is pressed.

Figure 10:
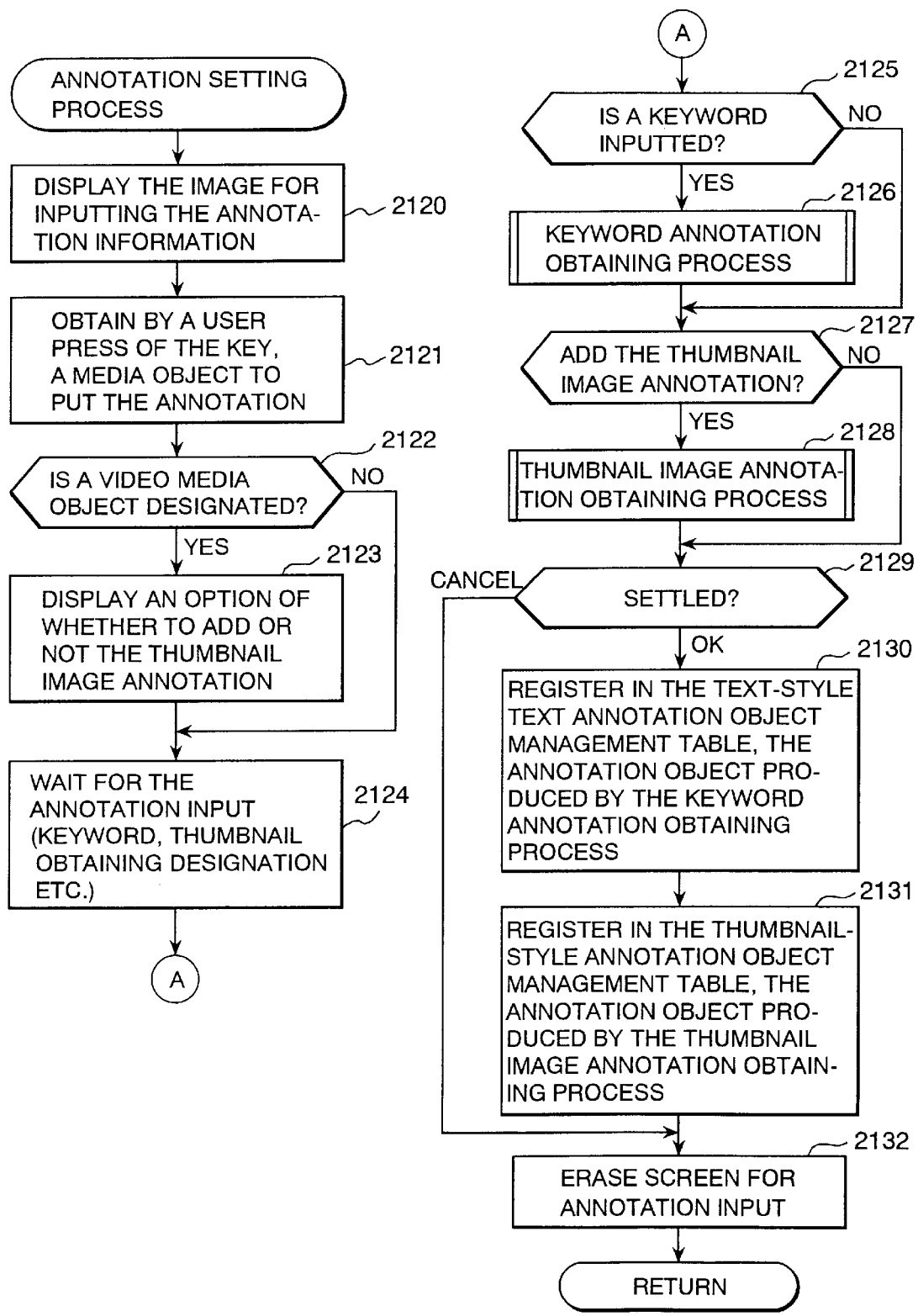
FIG. 10 is a detailed flow chart of the annotation setting process shown in FIG. 9.

FIG. 10 shows a detailed flow chart of the annotation setting process 2110 shown in FIG. 9. In FIG. 10, for convenience, two types of annotations such as keyword (text) and thumbnail image are used. Needless to say, the annotation types are not limited to these. For example, to add the user definition type, it is desired to add a processing flow therefor.

In the annotation setting process, the screen for inputting the annotation information is displayed on the display device 40 first (Step 2120). When there are a plurality of media objects to put an annotation (for example, video and audio), the user is instructed the media object to designate and the CPU 10 obtains the target media object by a user press of the key (Step 2121). Next, the CPU 10 decides whether the target media object to annotate is video or not (Step 2122). When video is designated, the CPU 10 displays an option of whether to add or not the thumbnail image annotation (Step 2123). Thereafter, the CPU 10 waits for the annotation input (keyword, thumbnail obtaining designation, etc.) (Step 2124).

To put the keyword annotation to the specific range designated by the annotation range designation key, the user inputs the desired character string (keyword) by the I/O device 30, and to add a thumbnail image, the user clicks Thumbnail Obtaining which is the option displayed at Step 2123.

When the user inputs the keyword, the CPU 10 executes the keyword annotation obtaining process (Steps 2125 and 2126). When Thumbnail Obtaining is designated, the CPU 10 executes the thumbnail image annotation obtaining process (Steps 2127 and 2128). With respect to the annotation to put to the specific range, there are three ways available such as one of keyword and thumbnail image and both of them. A plurality of keywords or a plurality of thumbnail images may be defined in one range. The keyword/thumbnail annotation obtaining processes (Steps 2126 and 2128) will be described in detail in FIGS. 11 to 13.

After the annotation obtaining process is performed, the CPU 10 decides whether cancel is designated by the user or not (Step 2129). When cancel is not designated, the CPU 10 registers the annotation object produced by the keyword annotation obtaining process in the text annotation object management table 70 as shown in FIG. 4 (Step 2130) and registers the annotation object produced by the thumbnail image annotation obtaining process in the thumbnail-style annotation object management table 70 as shown in FIG. 5 (Step 2131). Thereafter, the CPU 10 erases the screen for annotation input (Step 2132) and returns to Step 2111 shown in FIG. 9. On the other hand, when cancel is designated by the user, the CPU 10 erases the screen for annotation input at the point of time and returns to Step 2111 shown in FIG. 9.

Figure 11:
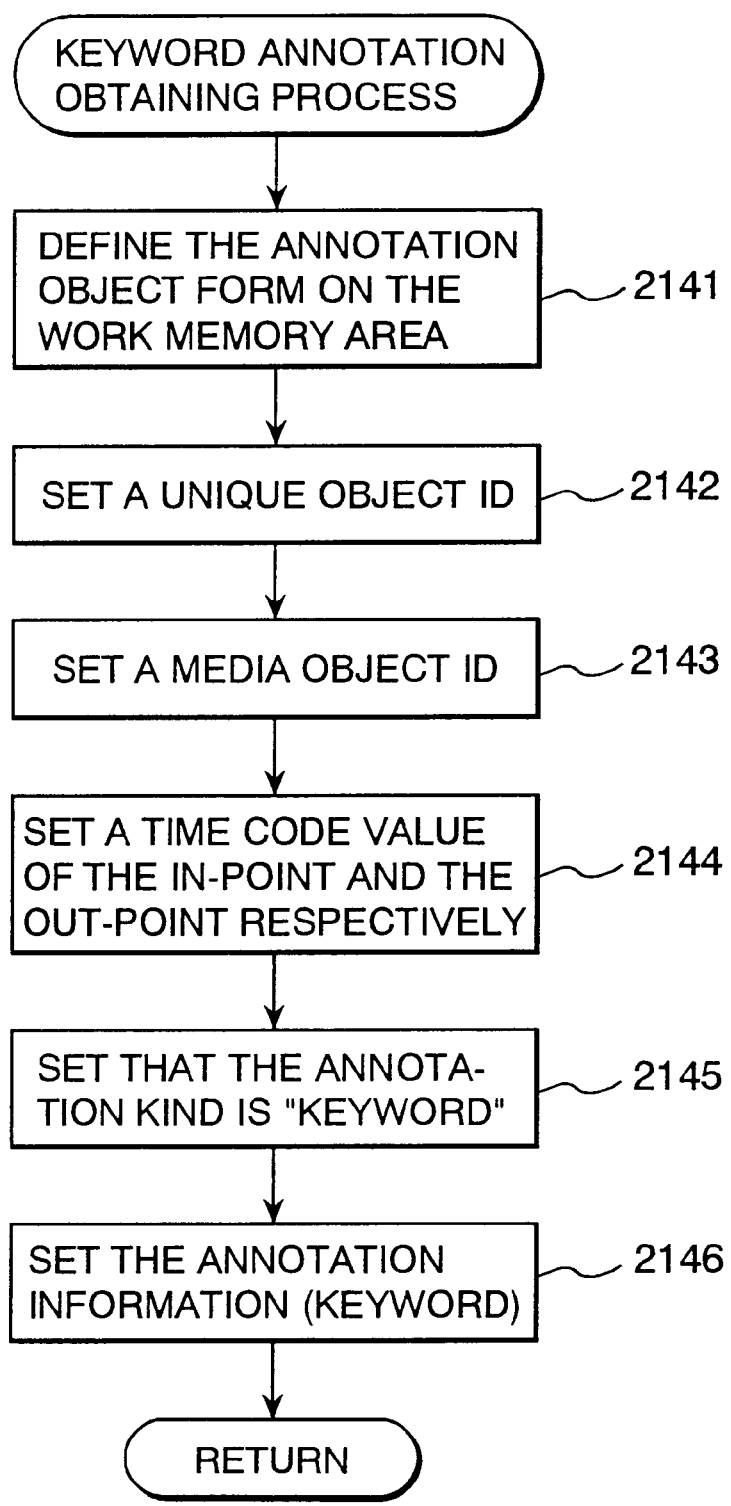
FIG. 11 is a detailed flow chart of an example of the keyword annotation obtaining process shown in FIG. 10.

FIG. 11 shows a detailed flow chart of the keyword annotation obtaining process shown in FIG. 10 (Step 2126). In the keyword annotation obtaining process, the CPU 10 defines a temporary annotation object in the form shown in the record 710 in FIG. 4 in the work area 25 of the memory 20 first (Step 2141). Next, the CPU 10 obtains a unique object ID 701 and sets it in the annotation object 710 (Step 2142). This object ID 701 may be, for example, a serial number and is automatically given by the system. Continuously, the CPU 10 sets the media objects ID 702 to put the annotation which are obtained at Steps 2101 and 2121 and the in-point and out-point time code values 703 and 704 which are obtained at Step 2108 in the annotation object 710 (Steps 2143 and 2144). Furthermore, the CPU 10 sets "keyword" as an annotation kind 705 (Step 2145) and sets the character string (keyword) obtained at Step 2124 as annotation information 706 (Step 2146). By doing this, one annotation object 710 is completed and registered in the annotation object management table 70 shown in FIG. 4 at Step 2130 shown in FIG. 10.

Figure 12:
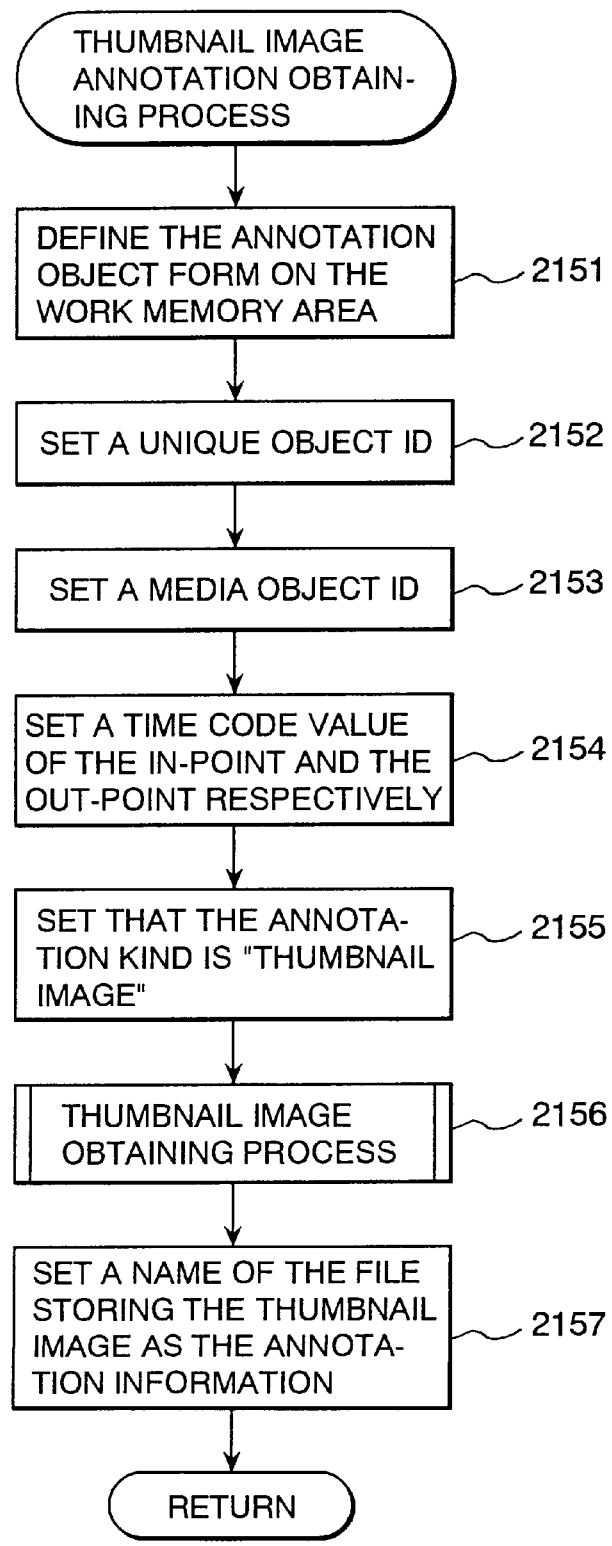
FIG. 12 is a detailed flow chart of an example of the thumbnail image annotation obtaining process shown in FIG. 10.

FIG. 12 shows a detailed flow chart of the thumbnail image annotation obtaining process (Step 2128) shown in FIG. 10. This is almost similar to that shown in FIG. 11 basically and a respect that the thumbnail still image obtaining process (Step 2156) is added is different. The thumbnail image obtaining process will be explained in FIG. 13.

In the thumbnail image annotation obtaining process, in the same way as with the keyword annotation obtaining process shown in FIG. 11, the CPU 10 defines a temporary annotation object in the form shown in the record 710 in FIG. 5 in the work area 25 of the memory 20 first (Step 2151). Next, the CPU 10 sets a unique object ID 701 such as a serial number in the annotation object 710 (Step 2152) and continuously sets the media objects ID 702 to put the annotation which are obtained at Steps 2101 and 2121, the in-point and out-point time code values 703 and 704 which are obtained at Step 2108, and "thumbnail" as an annotation kind 705 one after another (Steps 2153 to 2155). The CPU 10 executes the thumbnail image obtaining process (Step 2156) and sets the name of the file storing the thumbnail image obtained by this process as the annotation information 706 (Step 2157). By doing this, one annotation object 710 is completed and registered in the thumbnail image annotation management table 70 shown in FIG. 5 at Step 2131 shown in FIG. 10.

Figure 13:
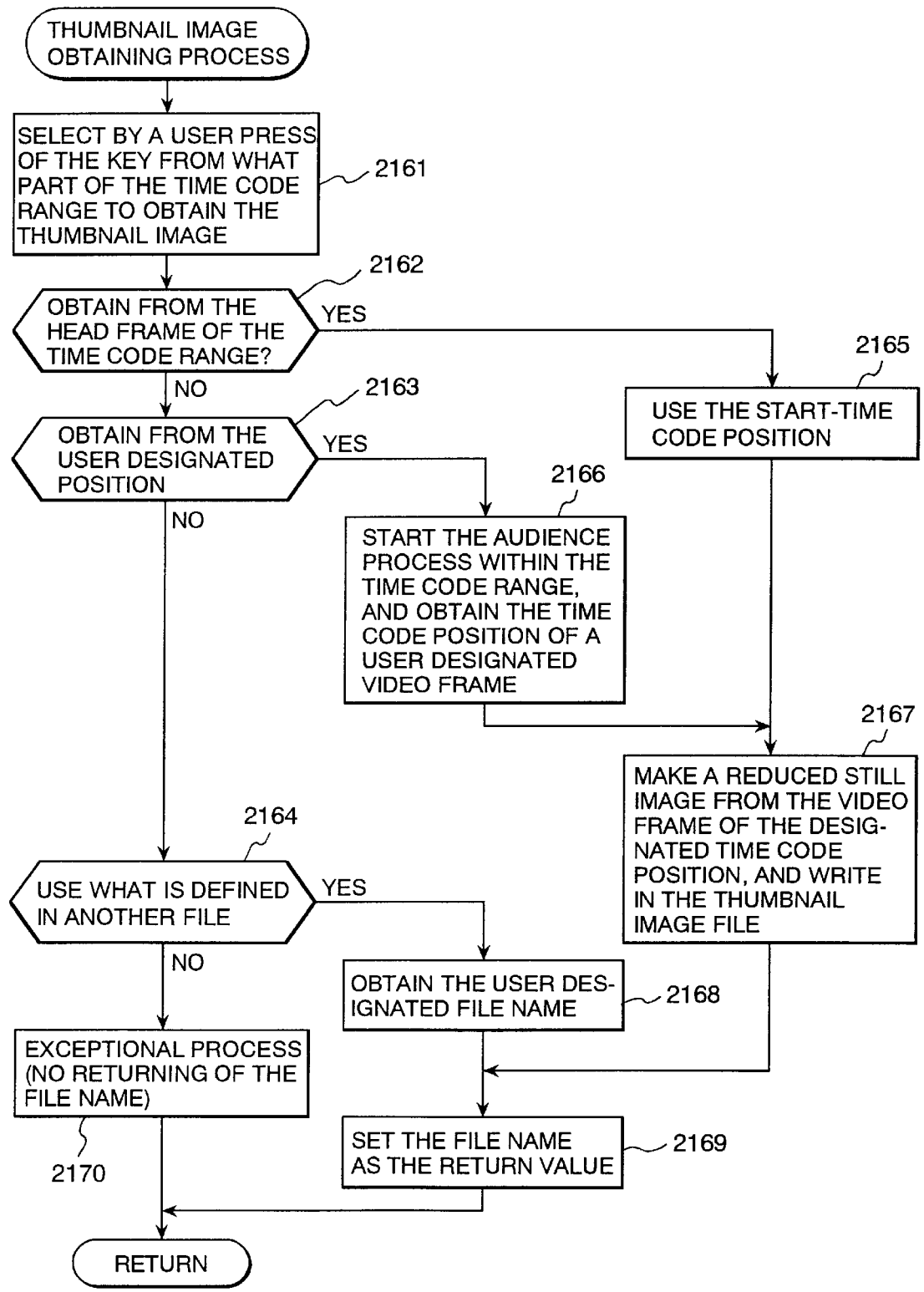
FIG. 13 is another detailed flow chart of an example of the thumbnail image obtaining process shown in FIG. 12.

Next, the thumbnail image obtaining process (Step 2156) shown in FIG. 12 will be explained by referring to FIG. 13. A thumbnail image may be directly obtained from an image in operation or one defined in another file may be used. The flow chart shown in FIG. 13 may be applied to any of them. In this case, a file for storing a thumbnail image obtained from an image in operation is referred to as a thumbnail file. For this thumbnail file or another file, for example, a specific area of the multimedia database 90 shown in FIG. 1 may be used. The thumbnail file may serve as another file.

In the thumbnail image obtaining process, the CPU 10 selects from what part of the target range (time code range) designated by the annotation range designation key to obtain the thumbnail image by a user press of the key first (Step 2161) and decides whether to obtain it from the head frame of the time code range or from the user designated position other than the head frame (Steps 2162 and 2163). When the thumbnail image is obtained from the head frame of the time code range, the CPU 10 makes a reduced still image from the video frame of the time code value using the in-point time code value and writes it in the thumbnail image file (Steps 2165 and 2167). When the thumbnail image is obtained from the user designated position other than the head frame, the CPU 10 starts the audience process within the time code range, obtains the time code of a user designated video frame newly (Step 2166), makes a reduced still image from the video frame of the time code value, and writes it in the thumbnail image file (2167). In either case, the file name at this time is set as annotation information of the annotation object (Step 2169).

On the other hand, when the user does not designate the head frame in the time code range and other optional frames, the CPU 10 decides that what is defined in another file is used (Step 2164), obtains the file name by a user press of the key (Step 2168), and sets the file name as annotation information of the annotation object (Step 2169). When an appropriate thumbnail image cannot be found, the file name will not be returned from the user. If this occurs, an exceptional process such as cancellation of the thumbnail image obtaining process is performed (Step 2170).

<ANNOTATION RETRIEVAL PROCESS FOR ANNOTATION RETRIEVAL AND RESULT OF RETRIEVAL>

Figure 14:
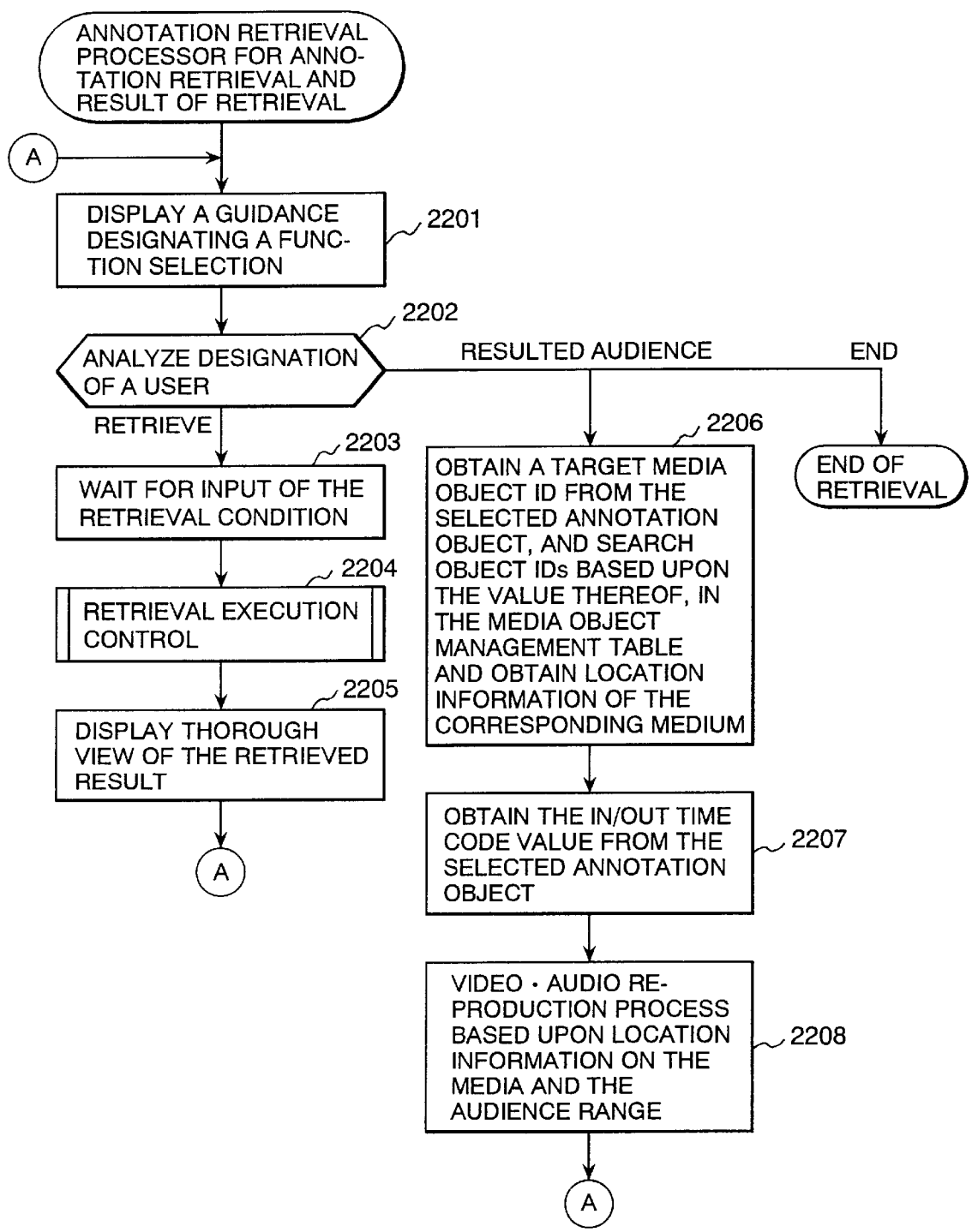
FIG. 14 is a whole flow chart of an embodiment of the annotation retrieval process for annotation retrieval and result of retrieval.

This is a process of executing the annotation retrieval under the retrieval condition designated by a user, offering an annotation list of the retrieval results to the user, and playing the specific video scene searched by the user and audio on the basis of it. FIG. 14 shows a whole flow chart of the annotation retrieval process for annotation retrieval and result of retrieval.

The CPU 10 displays a guidance designating a function selection on the display device 40 (Step 2201) and analyzes the function selected by the user (Step 2202). When the user selects Annotation Retrieval, the CPU 10 waits for input of the retrieval condition from the I/O device 30 by the user (Step 2203). When the user inputs the retrieval condition, the CPU 10 retrieves the annotation object management table 70 and extracts an annotation object (710 shown in FIGS. 4 and 5) having annotation information (706 shown in FIGS. 4 and 5) coincident with the retrieval condition (Step 2204). One or a plurality of annotation objects 710 are extracted. The CPU 10 displays through view of the annotation information 706 of each extracted annotation object 710 on the display device 40 together with the annotation object ID (701 shown in FIGS. 4 and 5) and waits for the next selection by the user (Step 2205). In the text type shown in FIG. 4, the annotation information 706 is displayed as it is. However, in the thumbnail image style shown in FIG. 5, a reduced still image of the file shown in the annotation information 706 is displayed. As annotation retrieval, various retrievals such that only the keyword is simply retrieved and no thumbnails are checked, or a list of all thumbnails is extracted, or when an annotation retrieved by the keyword is given a thumbnail, the thumbnail is also extracted together may be considered. Retrieval execution control at Step 2204 will be described in detail in FIGS. 15 to 18.

It is assumed that by viewing the retrieved results on the display device 40, the user selects an annotation object and designates Resultant Audience (play). In this case, the CPU 10 obtains the object ID 702 of the target medium from the selected annotation object 710 first, checks the object ID 501 of the media object management table 50 shown in FIG. 2 on the basis of the object ID, and obtains the location information 504 of the said media object (Step 2206). Next, the CPU 10 obtains the in and out time code values 703 and 704 from the selected annotation object 710 (Step 2207). On the basis of the location information of the media object and the in/out time code values which are obtained at Steps 2206 and 2207, the CPU 10 reads the media object from the multimedia database 90 in the predetermined range and for example, in the case of video, executes the reproduction process such as display on the display device 40 (Step 2208).

When the displayed video is not the one searched by the user, he stops the current play, selects the next element (annotation object) by viewing the retrieved results, and designates Resultant Audience again. By doing this, the processes at Steps 2206 to 2208 are repeated. When the user designates End, the annotation retrieval process for annotation retrieval and result of retrieval ends. Although omitted in FIG. 14, as another function, for example, addition of function selection for transferring the retrieved result to the predetermined location may be considered.

Figure 15:
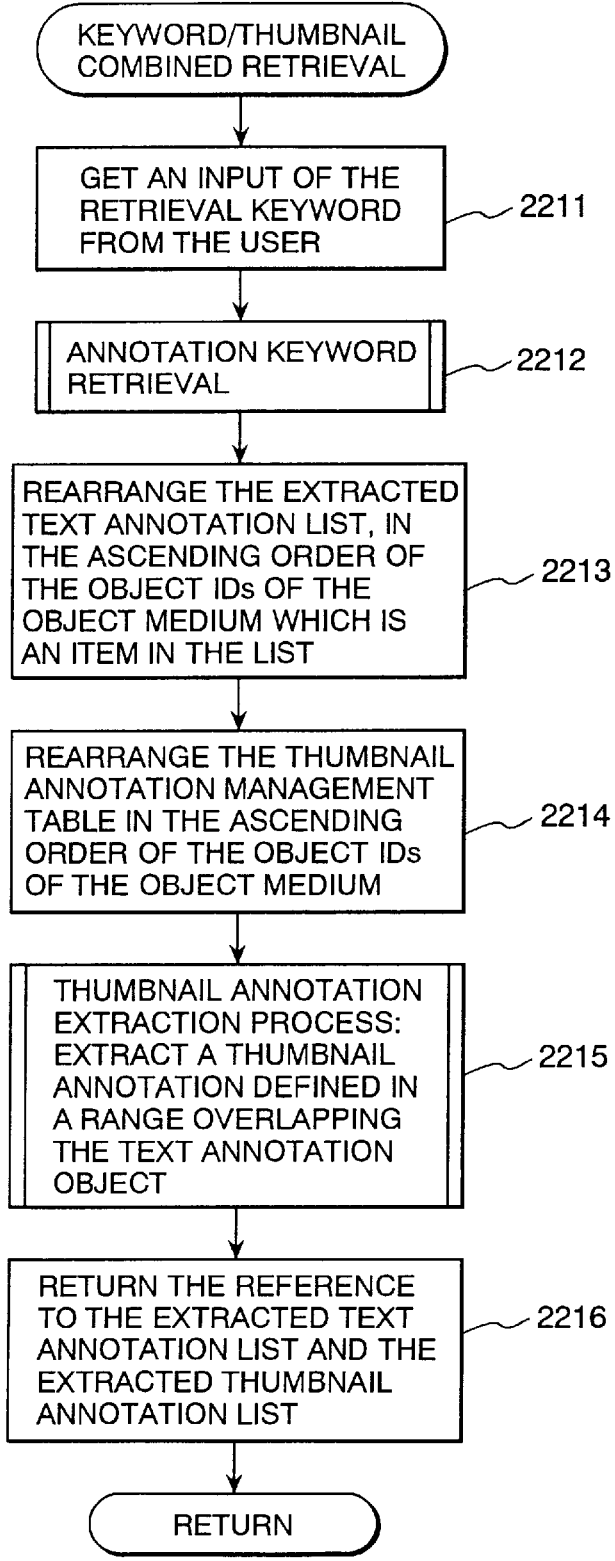
FIG. 15 is a detailed flow chart of an example of the retrieval execution control shown in FIG. 14.

FIG. 15 shows a detailed flow chart of Retrieval execution control (Step 2204) shown in FIG. 14. In this case, when a thumbnail is defined in the coincident portion in keyword retrieval, a process of also extracting the thumbnail is shown. This is called a keyword/thumbnail combined retrieval process.

The CPU 10 obtains input of the retrieval keyword from the user by the I/O device 30 (Step 2211). The CPU 10 retrieves the text annotation object management table 70 shown in FIG. 4 on the basis of this inputted retrieval keyword and extracts all annotation objects 710 having a keyword (character string) coincident with or similar to the retrieval keyword as annotation information 706 (Step 2212). The annotation keyword retrieval process will be described more in detail in FIG. 16. The CPU 10 rearranges the text annotation object list extracted at Step 2212 in the ascending order of the object IDs 702 of the object medium (Step 1213). Next, the CPU 10 rearranges the annotation objects (thumbnail annotation objects) 710 of the thumbnail annotation management table 70 shown in FIG. 5 in the ascending order of the object IDs 702 of the object medium (Step 1214) and extracts the thumbnail annotation (reduced still image) defined in the time code ranges 703 and 704 overlapping with the text annotation object together with the annotation information (Step 1215). The extraction of the thumbnail annotation is realized by referring to the group of the thumbnail annotation objects rearranged at Step 2214 for each extracted text annotation object repeatedly. The thumbnail annotation extraction process will be described more in detail in FIGS. 17 and 18. Finally, the reference to the text annotation list extracted at Step 2212 and the thumbnail annotation list extracted at Step 2215 is returned to Step 2205 shown in FIG. 14 and the keyword/thumbnail combined retrieval process ends (Step 2216).

At Step 2205 shown in FIG. 14, the CPU 10 displays through view of the extracted text annotation list of keyword retrieved results, refers to the extracted thumbnail annotation list at the same time, and when a thumbnail is defined in the coincident portion in keyword retrieval, adds and displays the thumbnail annotation to the said text annotation.

Figure 16:
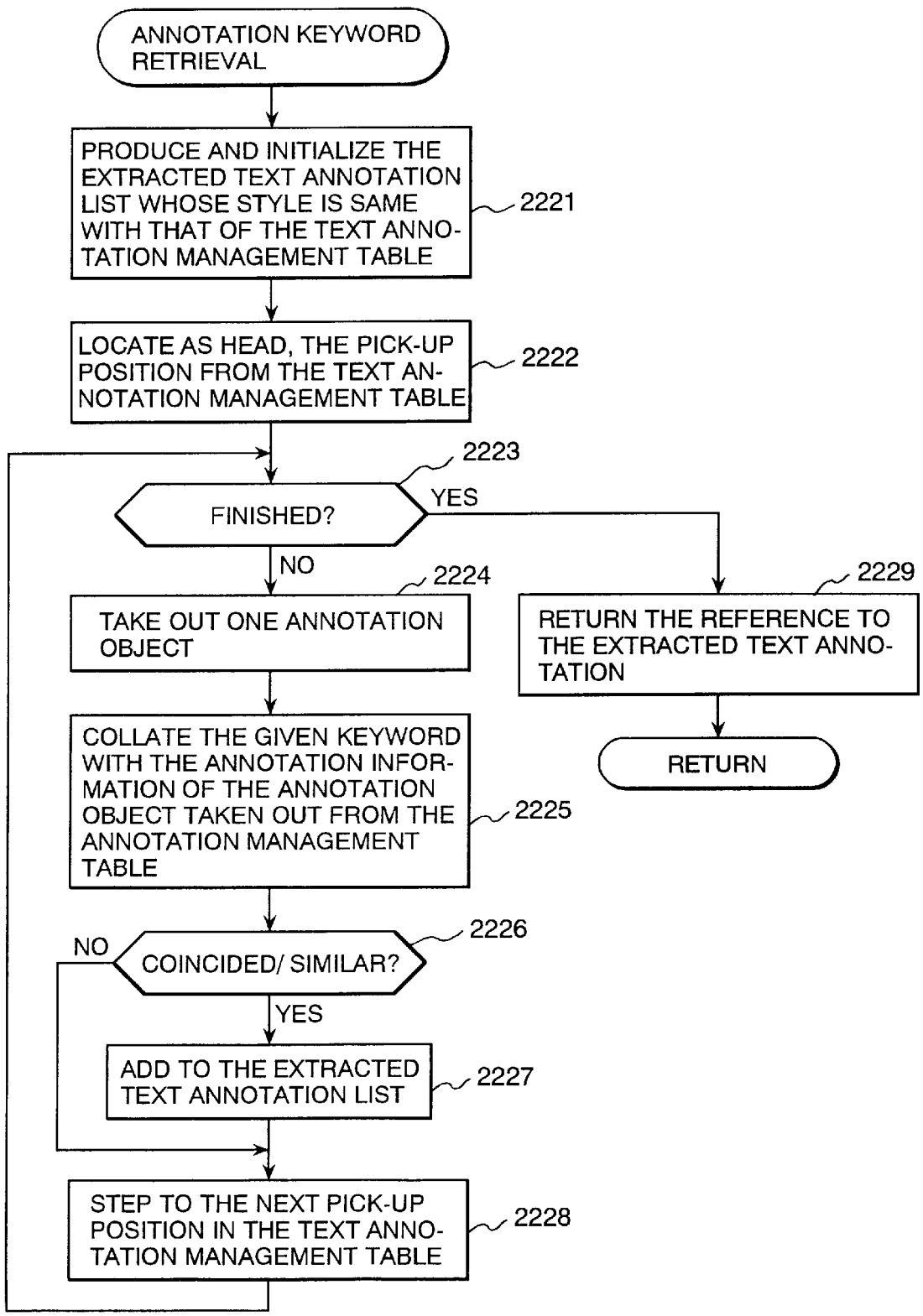
FIG. 16 is another detailed flow chart of an example of the annotation keyword retrieval process shown in FIG. 15.

Next, the annotation keyword retrieval process (Step 2212) shown in FIG. 15 will be described in detail by referring to FIG. 16. The CPU 10 produces and initializes an extracted text annotation list whose style is the same as that of the text annotation object management table 70 shown in FIG. 4 in the work area 25 of the memory 20 (Step 2221) and locates the pick-up position from the text annotation object management table 70 as a head (Step 2222). The CPU 10 takes out the annotation object 710 at the head position of the text annotation object management table 70 shown in FIG. 4 (Step 2224), collates the keyword given by the user which is obtained at Step 2211 shown in FIG. 15 with the annotation information (keyword) 706 of the annotation object 710 (Step 2225), and decides whether they are coincident with or similar to each other (Step 2226). Collation may be executed by a well-known text retrieval means such as longest coincidence, partial coincidence, or synonym coincidence based on the thesaurus dictionary. When the keyword (retrieval condition) given from a user is coincident with or similar to the annotation information 706 of the annotation object 710 taken out from the text annotation object management table 70, the CPU 10 adds the taken-out annotation object to the extracted text annotation list (Step 2227). Thereafter, the CPU 10 steps to the next pick-up position in the text annotation object management table 70 (Step 2228) and repeats the same operation. When the CPU 10 finishes the retrieval of all the annotation objects 710 of the text annotation object management table 70 like this (Step 2223), the CPU 10 returns the reference of the extracted text annotation list to Step 1213 shown in FIG. 15 and ends the retrieval of the annotation keyword.

Next, the thumbnail annotation extraction process (Step 2215) shown in FIG. 15 will be described in detail by referring to FIGS. 17 and 18.

Figure 17:
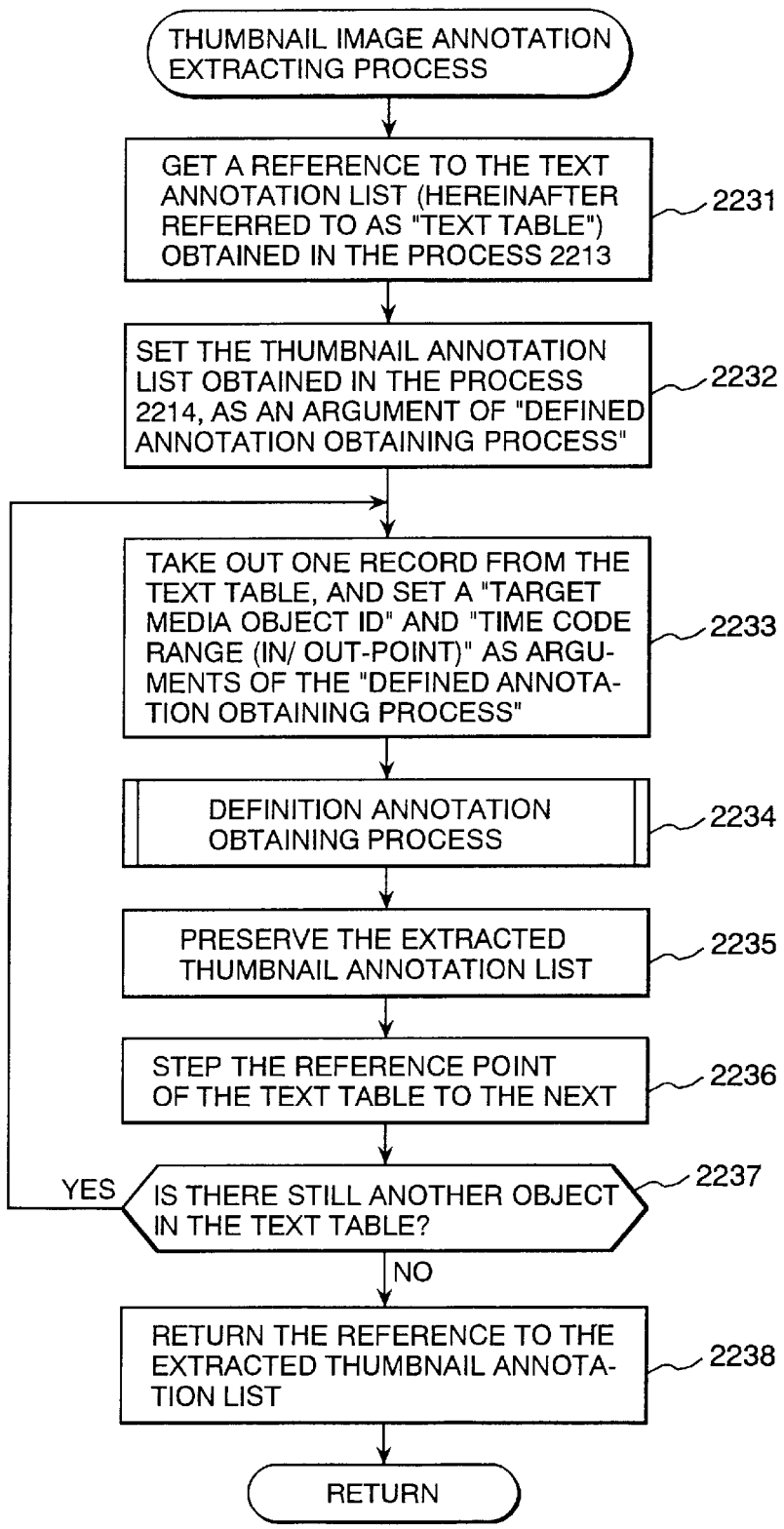
FIG. 17 is another detailed flow chart of an example of the thumbnail image annotation extracting process shown in FIG. 15.

FIG. 17 shows a whole flow chart of the thumbnail annotation extraction process. The CPU 10 obtains a reference to the text annotation list in which the group of text annotation objects extracted by the annotation keyword retrieval process at Step 2213 shown in FIG. 15 is rearranged in the ascending order of the object IDs of the object media (Step 2231). Hereinafter, in this process, the text annotation list is called a text table.

Next, the thumbnail annotation list in which the croup of thumbnail annotation objects in the thumbnail annotation object management table 70 shown in FIG. 5, which is obtained at Step 2214 shown in FIG. 15, is rearranged in the ascending order of the object IDs 702 of the object medium is set as an argument of the defined annotation obtaining process (Step 2232). The CPU 10 takes out one text annotation object from the text table and sets the target media object ID and the time code range as arguments of the defined annotation obtaining process (Step 2233) and executes the defined annotation obtaining process (Step 2234). In the defined annotation obtaining process, the CPU 10 searches the thumbnail annotation list set at Step 2232 on the basis of the target media object ID and time code range which are set at Step 2233 and extracts the thumbnail annotation object in which the target media object ID is the same and a thumbnail is defined in the portion where the time code range is overlapped. The defined annotation obtaining process will be described in detail in FIG. 18. The CPU 10 preserves the thumbnail annotation list extracted by the defined annotation obtaining process in the extracted thumbnail annotation list produced in the work memory 27 of the memory 20 (Step 2235), then steps the reference point of the text table to the next position (Step 2236), and decides whether there is still another text annotation object to be referred to in the text table or not (Step 2237). The CPU 10 takes out the text annotation objects sequentially from the text table like this and repeats the defined annotation obtaining process. When the objects to be referred to are all gone from the text table, the CPU 10 returns the reference to the extracted thumbnail annotation list to Step 2216 shown in FIG. 15 and the thumbnail annotation extraction process ends (Step 2238)

Figure 18:
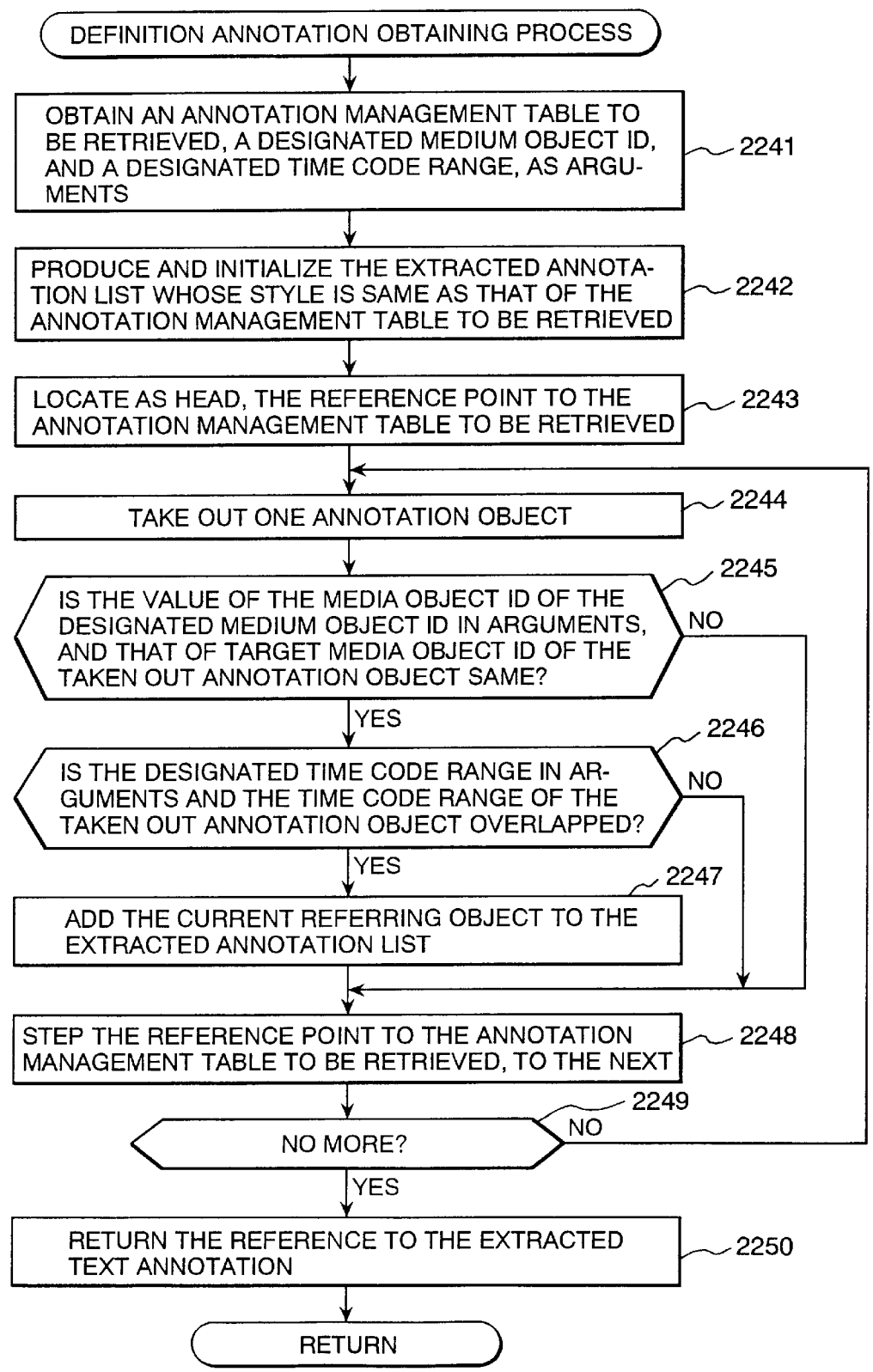
FIG. 18 is a flow chart of an example of the defined annotation obtaining process used in FIGS. 17 and 19.

FIG. 18 shows a detailed flow chart of the defined annotation obtaining process. The defined annotation obtaining process is also used to generate a copied section object which will be described later, so that FIG. 18 shows a generalized representation.

Initially, the CPU 10 obtains an annotation management table to be retrieved, a designated medium object ID, and a designated time code range as arguments (Step 2241). In the case of the thumbnail annotation extraction process shown in FIG. 17, the annotation management table to be retrieved is the thumbnail annotation management table (thumbnail annotation list) and the designated medium object ID and designated time code range are the text annotation object ID and time code range thereof taken out from he text table which are obtained at Step 2231. Next, the CPU 10 produces and initializes the extracted annotation list (the extracted thumbnail annotation list in the thumbnail annotation extraction process) whose style is the same as that of the annotation management table to be retrieved in the work area 25 of the memory 20 (Step 2242) and locates the reference point of the annotation management table to be retrieved as a head (Step 2243).

Next, the CPU 10 takes out one annotation object from the annotation management table to be retrieved and sequentially decides whether the value of the target media object ID is the same as that of the designated medium object ID and the time code range thereof is overlapped with the designated time code range (Steps 2245 and 2246). When the conditions of the two are satisfied, the CPU 10 adds the annotation object to the extracted annotation list (Step 2247). Thereafter, the CPU 10 steps the reference point to the annotation management table to be retrieved next (Step 2248) and decides whether there is still another annotation object to be referred to (Step 2249). When there is such an annotation object, the CPU 10 returns to Step 2244, takes out the next annotation object from the annotation management table to be retrieved, and repeats the operations at Steps 2245 to 2247. When the annotation objects to be referred to are all gone from the annotation management table to be retrieved by doing this, the CPU 10 returns the reference to the extracted annotation list and one defined annotation obtaining process ends (Step 2250). In the thumbnail annotation extraction process shown in FIG. 17, the reference to the extracted thumbnail annotation list is returned to Step 2235.

<GENERATION PROCESS FOR COPIED SECTION OBJECT AND ANNOTATION OBJECT>

This is a process of generating the copied section object 610 shown in FIG. 3 when a user uses a part of a media object as a component of another media object in the editing work and when an annotation object is already defined for the portion of the citation source object (source object), automatically generating an annotation object for the citation destination object (destination object) at the same time by diverting the annotation object.

In the annotation object generation process, the CPU 10 checks the citation range of the media object (source object) and all annotation objects put to the media object and checks whether an annotation object overlapping with the target range is defined. When defined, the CPU 10 copies the character string (keyword) as an annotation object of the destination media object as it is, copies the storage location for a thumbnail image, and sets a range overlapping with the defined range of the source annotation object within the applied range of the destination media object. By this process, annotation information set for the original material can be hit as a candidate in the annotation retrieval shown in FIG. 14 because the annotation is always cited automatically when the material is cited.

Figure 19:
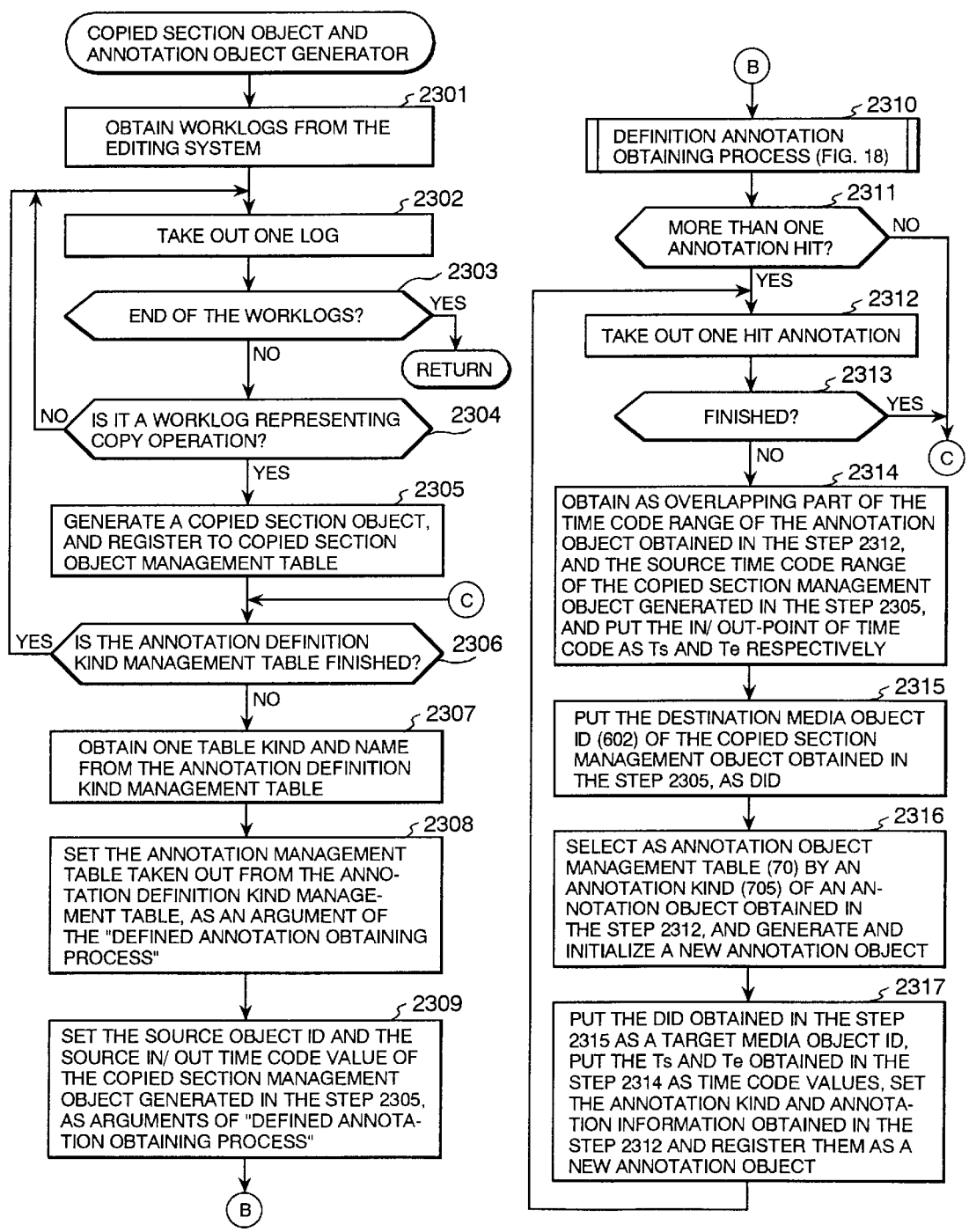
FIG. 19 is a flow chart of an embodiment of the copied section object and annotation object generating process.

FIG. 19 shows a whole flow chart of the generation process for copied section object and annotation object.

The CPU 10 receives a worklog from the editing system (Step 2301). In this worklog, when a user executing the editing work performs an operation (copy operation) for using a part of a media object as a component of another media object, the discrimination information of the citation source/citation destination media and the citation range (the in-point and out-point) are included. The editing system itself is well-known, so that the explanation thereof will be omitted here.

Next, the CPU 10 takes out one worklog (Step 2302) and decides whether it is the end of the worklogs or not (Step 2303). When it is not the end, the CPU 10 decides whether the worklog is a worklog representing the copy operation or not (Step 2304). When the worklog is not a worklog representing the copy operation, the CPU 10 steps to obtaining of the next worklog. When the worklog is a worklog representing the copy operation, the CPU 10 generates the copied section object 610 shown in FIG. 3 on the basis of the worklog and registers it in the copied section object management table 60 (Step 2305).

Now, the copied section object generation process for one worklog ends. When the worklog represents the copy operation, the subsequent annotation object generation process starts continuously. The annotation object generation process is repeated for the defined kinds in the annotation object management table shown in the annotation definition kind management table 80 shown in FIG. 7.

In step 2306, the CPU 10 decides whether the annotation definition kind management table 80 is finished or not. When it is not finished, the CPU 10 obtains one annotation kind and table name from the annotation definition kind management table 80 (Step 2307) and sets the annotation object management table 70 (FIGS. 4, 5, and 6) represented by the table name as an argument of the defined annotation obtaining process (Step 2308). Next, the CPU 10 sets the source object ID 605, the source in time code value 606, and the source out time code value 607 of the copied section management object generated at Step 2305 also as arguments of the defined annotation obtaining process (Step 2309). With respect to the defined annotation obtaining process, the CPU 10 executes the process shown in FIG. 18 by putting the annotation object management table at Step 2308 as an annotation management table to be retrieved, the source object ID 605 at Step 2309 as a designated media object ID, and the source in/out time code values 606 and 607 as designated time code ranges (Step 2310). The CPU 10 decides whether more than one worklog is hit. When there is no worklog to be hit, the CPU 10 returns to Step 2306.

On the other hand, when there is more than one worklog to be hit, the CPU 10 takes out the hit annotation objects one by one and performs the processes at Steps 2314 to 2317. The CPU 10 obtains an overlapping part of the two ranges of the source time code ranges 606 and 607 of the hit annotation object and the copied section management object 610 generated at Step 2305 and puts the in/out points thereof as Ts and Te respectively (Step 2314). Next, the CPU 10 puts the destination media object ID 602 of the copied section management object 610 generated at Step 2305 as DID (Step 2315). Next, the CPU 10 selects the text type or the thumbnail type as an annotation object management table 70 from the annotation discrimination column of the hit annotation object 710 and generates and initializes a new annotation object 710 (Step 2316) Next, for this annotation object, the CPU 10 puts the DID obtained at Step 2315 as a target media object ID 702, puts Ts and Te obtained at Step 2314 as in/out time code values 703 and 704, sets the annotation kind 705 and annotation information 706 of the said hit annotation object obtained at Step 2312, and registers them as a new annotation object 710 (Step 2317). When the process is finished for all the hit annotation objects by doing this (Step 2313), the CPU 10 returns to Step 2306.

Hereunder, the CPU 10 loops Steps 2307 to 2317 until the reference record 810 of the annotation definition kind management table 80 is all gone. When the reference record 810 is all gone (Step 2306), the CPU 10 returns to Step 2302 and obtains the next worklog. When the worklog represents the copy operation, the CPU 10 executes the processes at Step 2305 and the subsequent steps again. When all the worklogs have been obtained (Step 2303), the generation process for copied section object and annotation object ends.

<ANNOTATION RETROACTIVE APPLICATION PROCESS>

This is a process of, when an annotation is defined for a specific range of a media object, checking a medium comprehensively by which the range is cited and defining an annotation also for the cited media object. Namely, when no annotation is put to the original material and the material is cited in various locations, the CPU 10 puts an annotation later when the annotation is defined for a media object. This process may be executed, for example, as a postprocess of the annotation registration process shown in FIG. 9. In the same way as with execution of the annotation object generation process shown in FIG. 19, an annotation can be hit as a candidate in the annotation retrieval by this process.

Figure 20:
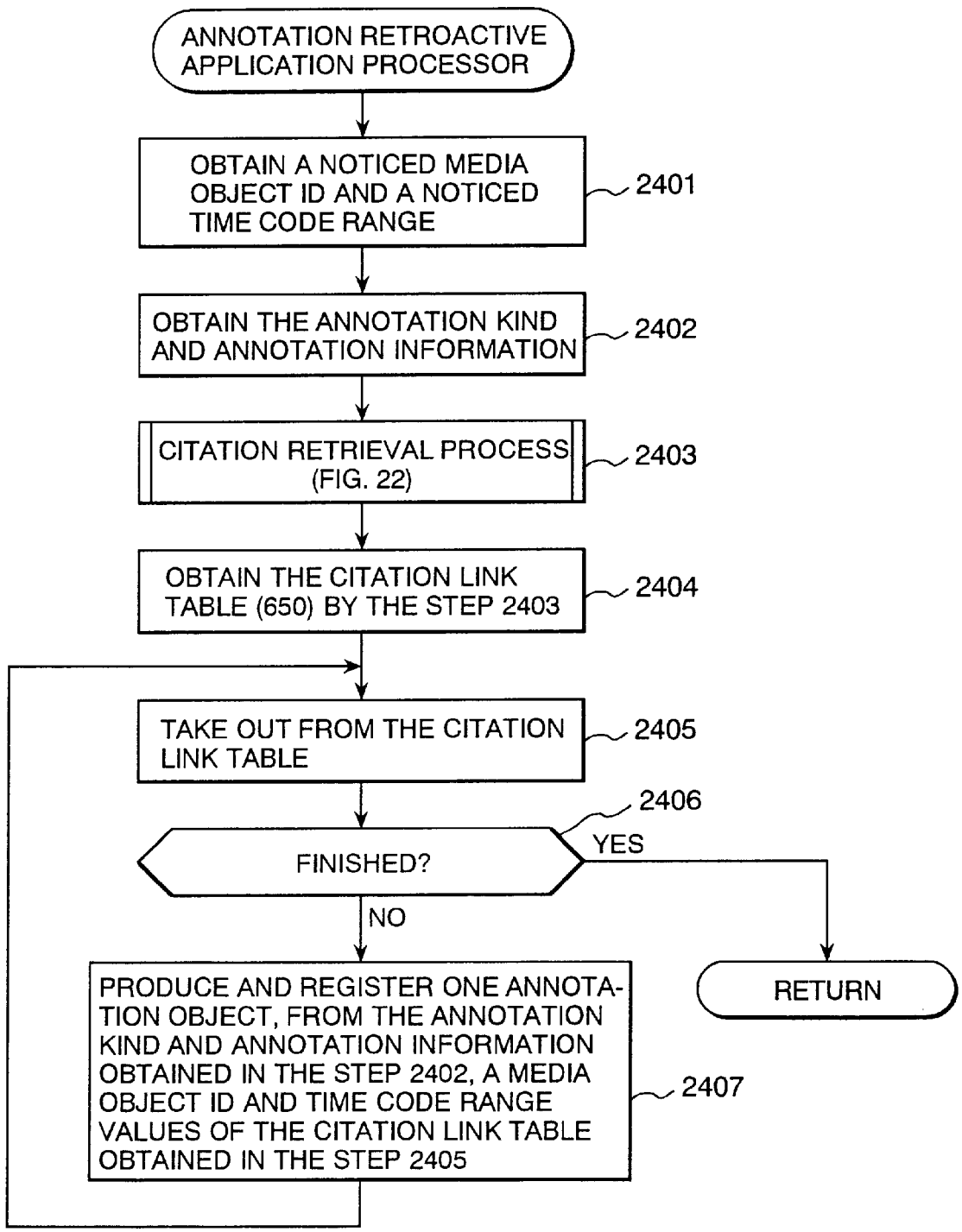
FIG. 20 is a whole flow chart of an embodiment of the annotation retroactive application process.

FIG. 20 shows a whole flow chart of the annotation retroactive application process. When an annotation is defined in a specific range for a media object and the annotation object 710 is set, the CPU 10 puts it as a noticed annotation object, obtains the media object ID and time code range thereof (Step 2401), furthermore obtains the annotation kind and annotation information (Step 2402), and starts the citation retrieval process. In the citation retrieval process, the CPU 10 retrieves the copied section object management table 60 on the basis of the noticed media object ID and time code range and checks a medium comprehensively by which the range is cited (Step 2403). The citation retrieval process will be described in detail by referring to FIGS. 21 and 22. By the citation retrieval process, the CPU 10 obtains the citation link table 650 as shown in FIG. 8 for the group of hit media objects (Step 2404). The CPU 10 takes out the media objects one by one from the citation link table 650 (Step 2405), produces one annotation object 710 from the annotation kind and annotation information obtained at Step 2402 and the media object ID (651 shown in FIG. 8) and the in/out time code values (652 and 653 shown in FIG. 8) of the media object obtained at Step 2405, and registers it in the annotation object management table 70 (FIGS. 4, 5, and 6) according to the annotation kind thereof (Step 2407). The CPU 10 repeats the process for each media object of the citation link table 650 and ends the annotation retroactive application process when there is no unprocessed entry remaining in the citation link table 650 (Step 2406).

Figure 21:
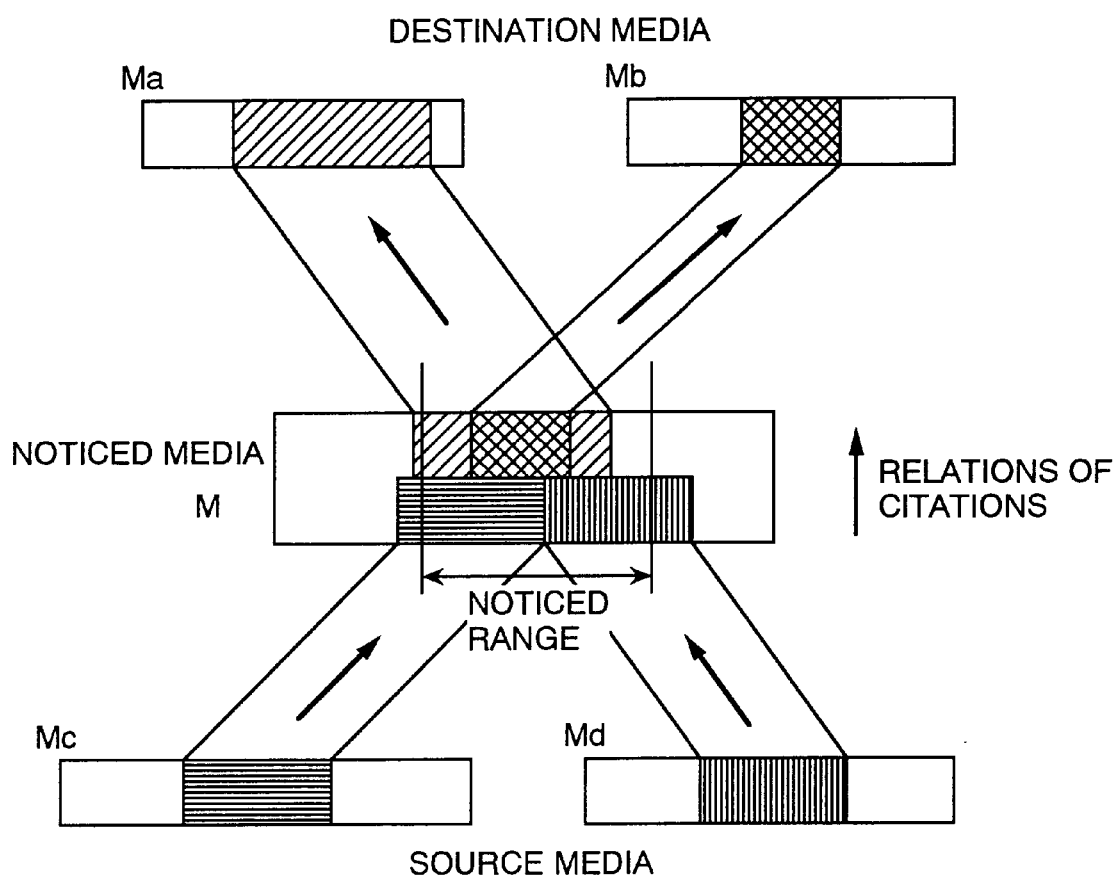
FIG. 21 is a drawing for explaining the outline of the annotation retroactive application process.

FIG. 21 is a drawing for explaining the outline of the citation retrieval process. To check relations of citations for the noticed range (time code range) of a media object M, the destination media object cited from the range is checked by the copied section object management table 60 first. In FIG. 21, media objects are represented by Ma and Mb, and zero or one destination media object or more are generally extracted. Also a source media object when the notice range of the media object M is cited from another media object is checked from the copied section object management table 60. In FIG. 21, media objects are represented by Mc and Md and also zero or one destination media object or more are generally extracted. As a result of these processes, a group of destination media objects and source media objects is obtained on the basis of the noticed media object. The CPU 10 obtains an overlapping range of these media objects and produces each record of the citation link table 650 shown in FIG. 8.

The CPU 10 puts these processes as a procedure, steps the noticed point to Ma, Mb, Mc, and Md next, and processes them recursively. However, for example, if, when the process from M to Ma is executed by a recursive call, the process is returned to citation to the origin (from Ma to M), the process is executed endlessly. Therefore, citation returning to the origin like this is excluded. Exclusion designation is carried out by designating the value of a media object ID 651. When processes executing a recursive call are all finished by doing this and the original process is returned, the citation link table 650 regarding all relations of citations is obtained.

Figure 22:
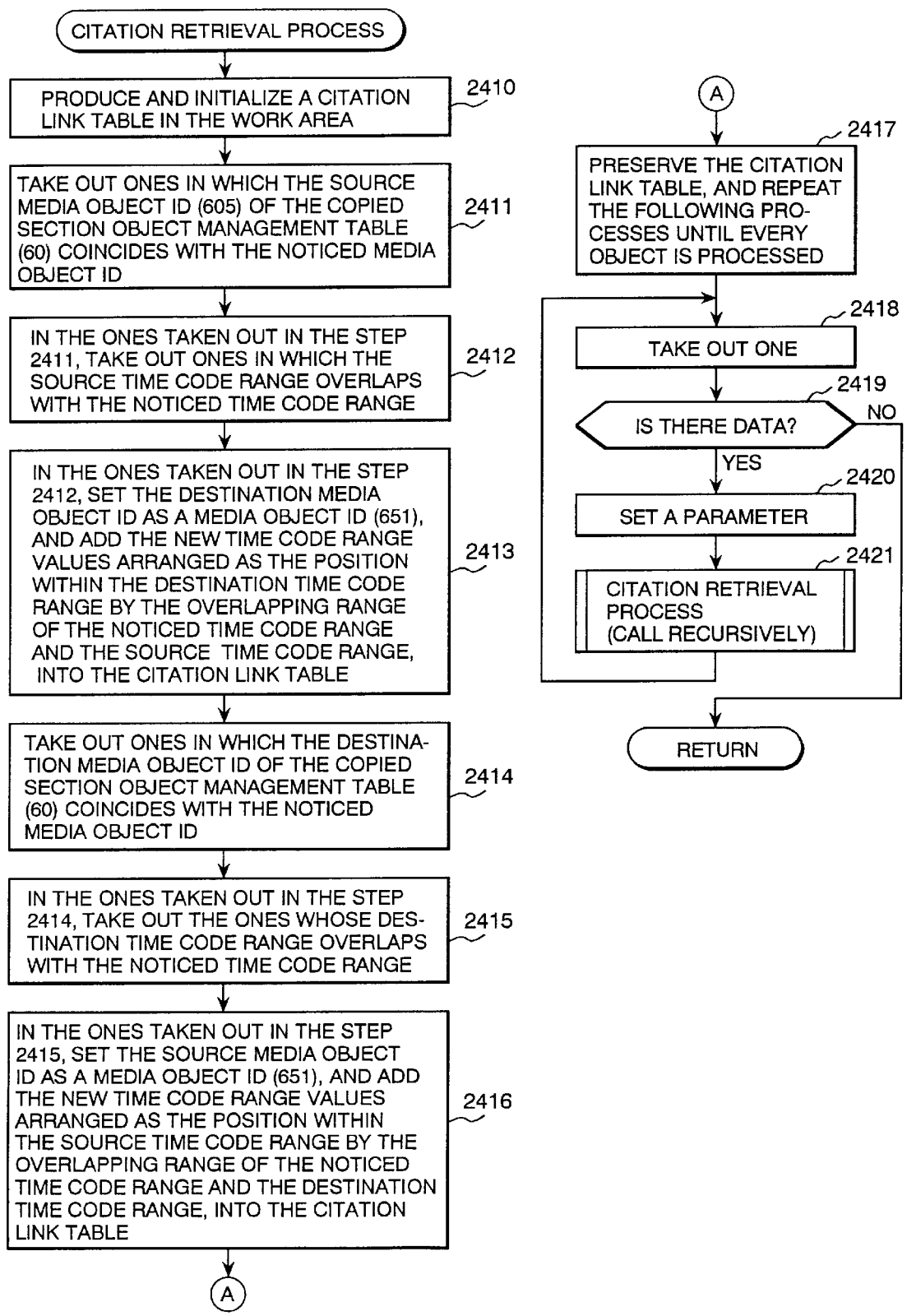
FIG. 22 is a detailed flow chart of an example of the citation retrieval process shown in FIG. 20.

FIG. 22 shows a detailed flow chart of the citation retrieval process (Step 2403) shown in FIG. 20. The CPU 10 produces and initializes the citation link table 650 shown in FIG. 8 in the work area 25 of the memory 20 (Step 2410). The CPU 10 searches the copied section object management table 60 shown in FIG. 3 and takes out copied section objects 610 in which the source media object ID 605 coincides with the noticed media object ID (Step 2411). However, when the object ID 601 of the referred copied section object 610 is an excluded object ID whose parameter is designated, the CPU 10 excludes the copied section object 610. Next, the CPU 10 takes out copied section objects in which the source time code ranges 606 and 607 are overlapped with the noticed time code range among the copied section objects 610 taken out at Step 2411 (Step 2412). With respect to the copied section objects 610 restricted at Step 2412, the CPU 10 produces a record 660 in which the destination object ID 602 thereof is put as a media object ID 651 and values converted to the time code range in the destination object are put as new time code ranges 652 and 653 on the basis of the overlapping ranges between the noticed time code range and the destination time code ranges 606 and 607, and adds it to the citation link table 650 (Step 2413). By doing this, for example, for the noticed medium M shown in FIG. 21, the objects of the destination media Ma and Mb thereof are registered in the citation link table 650.

Next, the CPU 10 searches the copied section object management table 60 again and takes out copied section objects 610 in which the destination media object ID 602 coincides with the noticed media object ID (Step 2414). However, also in this case, when the object ID 601 of the referred copied section object 610 is an excluded object ID whose parameter is designated, the CPU 10 excludes the copied section object 610. Next, the CPU 10 takes out copied section objects in which the destination time code ranges 603 and 604 are overlapped with the noticed time code range among the copied section objects 610 taken out at Step 2414 (Step 2415). With respect to the copied section objects 610 restricted at Step 2415, the CPU 10 produces a record 660 in which the source object ID 605 thereof is put as a media object ID 651 and values converted to the time code range in the source object are put as new time code ranges 652 and 653 on the basis of the overlapping ranges between the noticed time code range and the destination time code ranges 603 and 604 and adds it the citation link table 650 (Step 2416). By doing this, for example, for the noticed medium M shown in FIG. 21, the objects of the source media Mc and Md thereof are registered in the citation link table 650.

The CPU 10 puts the processes at Steps 2411 to 2416 as a procedure, preserves the media objects in the citation link table 650, steps the noticed media object until all the objects are processed, and calls and executes the citation retrieval process at Steps 2411 to 2416 recursively (Steps 2417 to 2412). The parameter setting at Step 2420 is an exclusion designation. When processes executing a recursive call are all finished by doing this and the original process is returned, media objects of all relations of citations for the noticed media object are registered in the citation link table 650.

By the multimedia database retrieval method and system of the present invention, the good results indicated below can be obtained.

(1) When an annotation object when a user defines an annotation in a specific range of a media object is managed and an annotation list coinciding with the retrieval condition in annotation retrieval is presented to the user in a tabular form, a material having the contents in the desired recording position intended by the user can be effectively retrieved among a large amount of video and audio materials.

(2) When reduced images are displayed in a tabular form as a group of retrieval results of annotation objects using still image data of one frame in a specific position of the video range and still image data provided beforehand in addition to a text (keyword) such as a character and numeric string as an annotation, a reduced image of the contents desired by a user can be obtained immediately from a video scene remembered by him.

(3) When an annotation is put once and an annotation object is automatically generated for a specific range in the link relation to all media objects including the media object thereof, labor saving for the registration work of annotation objects is realized.

What is claimed is:

1. A data management method in a database system storing a plurality of objects and first link information representing reference relationships among said plurality of objects, said method comprising the steps of:
   generating and storing second link information indicating a link with retrieval information and an object for retrieving the object;
   detecting a change of said first link information;
   generating retrieval information indicated by a link in said second link information given to a source object of the changed first link information, if the first link information is changed; and
   generating and storing changed second link information indicating a link with said retrieval information and a destination object of said changed first link information.

2. A data management method according to claim 1, further comprising the steps of:
   generating a copy of the retrieval information indicated by a link in said second link information given to the source object of the changed first link information; and
   generating and storing the changed second link information indicating a link with the copied retrieval information and the destination object of said changed first link information.

3. A data management method according to claim 1, wherein said object comprises data corresponding to a partial time span when said object has an attribute of time.

4. A data management method according to claim 1, wherein said object is an object having a time axis; and
   said first link information includes a start point and an end point on the time axis of the object having said time axis.

5. A data management method in a database system storing a plurality of objects and first link information representing reference relationships among said plurality of objects, said method comprising the steps of:
   generating and storing second link information indicating a link with a retrieval information and an object for retrieving the object;
   detecting a change of said first link information;
   generating retrieval information indicated by a link in said second link information given to a destination object of the changed first link information, if the first link information is changed; and
   generating and storing changed second link information indicating a link with said retrieval information and a source object of said changed first link information.

6. A data management method according to claim 5, further comprising the steps of:
   generating a copy of the retrieval information indicated by a link in said second link information given to the destination object of the changed first link information; and
   generating and storing the changed second link information indicating a link with the copy of the retrieval information and the source object of said changed first link information.

7. A data management method according to claim 5, wherein said object comprises data corresponding to a partial time span when said object has an attribute of time.

8. A data management method according to claim 5, wherein said object is an object having a time axis; and
   said first link information includes a start point and an end point on the time axis of the object having said time axis.

9. A data management method in a database system storing a plurality of objects and first link information representing reference relationships among said plurality of objects, said method comprising the steps of:
   generating and storing second link information indicating a link with retrieval information and an object for retrieving the object;
   detecting a change of said second link information;
   selecting an object indicated by a link in said first link information corresponding to an object indicated by a link of the changed second link information, if the second link information is changed; and
   generating and storing second link information indicating a link with the retrieval information indicated by a link of the changed second link information.

10. A data management method according to claim 9, further comprising the steps of:
    generating a copy of the retrieval information indicated by a link in said changed second link information; and
    generating the second link information indicating a link of an object indicated by a link of said first link information corresponding to an object indicated by a link of the changed second link information, and the copied retrieval information.

11. A data management method according to claim 9, wherein said object comprises data corresponding to a partial time span when said object has an attribute of time.

12. A data management method according to claim 9, wherein said object is an object having a time axis; and
    said first link information includes a start point and an end point on the time axis of the object having said time axis.

13. A computer readable storage medium storing a data management program, the program being executable in a database system storing a plurality of objects and first link information representing reference relationships among said plurality of objects, said data management program comprising the steps of:
    generating and storing second link information indicating a link with retrieval information and an object for retrieving the object;
    detecting a change of said first link information;
    generating retrieval information indicated by a link in said second link information given to a source object of the changed first link information, if the first link information is charged; and
    generating and storing changed second link information indicating a link with said retrieval information and a destination object of said changed first link information.

14. A computer readable storage medium storing a data management program, the program being executable in a database system storing a plurality of objects and first link information representing reference relationships among said plurality of objects, said data management program comprising the steps of:
    generating and storing second link information indicating a link with retrieval information and an object for retrieving the object;
    detecting a change of said first link information;
    generating retrieval information indicated by a link in said second link information given to a destination object of the changed first link information, if the first link information is changed; and
    generating and storing changed second link information indicating a link with said retrieval information and a source object of said changed first link information.

15. A computer readable storage medium storing a data management program, the program being executable in a database system storing a plurality of objects and first link information representing reference relationships among said plurality of objects, said data management program comprising the steps of:

generating and storing second link information indicating a link with retrieval information and an object for retrieving the object;

detecting a change of said second link information;

selecting an object indicated by a link in said first link information corresponding to an object indicated by a link of the changed second link information, if the second link information is changed; and generating and storing second link information indicating a link with the retrieval information indicated by a link of the changed second link information.

16. A data management program in a database system storing a plurality of objects and first link information representing reference relationships among said plurality of objects, said data management program comprising the codes for:

generating and storing second link information indicating a link with retrieval information and an object for retrieving the object;

detecting a change of said first link information;

generating retrieval information indicated by a link in said second link information given to a source object of the changed first link information, if the first link information is changed; and generating and storing changed second link information indicating a link with said retrieval information and a destination object of said changed first link information.

17. A data management program in a database system storing a plurality of objects and first link information representing reference relationships among said plurality of objects, said data management program comprising the codes for:

generating and storing second link information indicating a link with retrieval information and an object for retrieving the object;

detecting a change of said first link information;

generating retrieval information indicated by a link in said second link information given to a destination object of the changed first link information, if the first link information is changed; and generating and storing changed second link information indicating a link with said retrieval information and a source object of said changed first link information.

18. A data management program in a database system storing a plurality of objects and first link information representing reference relationships among said plurality of objects, said data management program comprising the codes for:

generating and storing second link information indicating a link with retrieval information and an object for retrieving the object;

detecting a change of said second link information;

selecting an object indicated by a link in said first link information corresponding to an object indicated by a link of the changed second link information, if the second link information is changed; and generating and storing second link information indicating a link with the retrieval information indicated by a link of the changed second link information.

* * * * *